United States Patent
Yan et al.

(10) Patent No.: US 11,330,595 B2
(45) Date of Patent: May 10, 2022

(54) METHOD FOR SENDING CONTROL INFORMATION, METHOD FOR RECEIVING CONTROL INFORMATION, AND APPARATUS

(71) Applicant: Huawei Technologies Co., Ltd., Shenzhen (CN)

(72) Inventors: Zhiyu Yan, Shenzhen (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 89 days.

(21) Appl. No.: 16/714,192

(22) Filed: Dec. 13, 2019

(65) Prior Publication Data

US 2020/0146018 A1 May 7, 2020

Related U.S. Application Data

(63) Continuation of application No. PCT/CN2018/090886, filed on Jun. 12, 2018.

(30) Foreign Application Priority Data

Jun. 15, 2017 (CN) .......................... 201710454090.5

(51) Int. Cl.
*H04W 72/04* (2009.01)
*H04L 1/00* (2006.01)
(Continued)

(52) U.S. Cl.
CPC ....... *H04W 72/0486* (2013.01); *H04L 1/0026* (2013.01); *H04L 1/1819* (2013.01);
(Continued)

(58) Field of Classification Search
None
See application file for complete search history.

(56) References Cited

U.S. PATENT DOCUMENTS

2009/0225738 A1 9/2009 Xu et al.
2011/0141928 A1* 6/2011 Shin ..................... H04L 5/0053
370/252
(Continued)

FOREIGN PATENT DOCUMENTS

CN 102377540 A 3/2012
CN 104348589 A 2/2015
(Continued)

OTHER PUBLICATIONS

Huawei et al., "Periodic CSI feedback enhancements for eCA", 3GPP Draft; R1-155094, XP051002082, Oct. 4, 2015, 6 pages.

*Primary Examiner* — Joseph E Avellino
*Assistant Examiner* — The Hy Nguyen
(74) *Attorney, Agent, or Firm* — Slater Matsil, LLP

(57) ABSTRACT

A sending method includes: determining, by a terminal device, a target uplink control channel in a first uplink control channel and a second uplink control channel, where the first uplink control channel corresponds to first uplink control information and the second uplink control channel corresponds to second uplink control information; and sending, by the terminal device, target uplink control information on the target uplink control channel, where the target uplink control information includes the first uplink control information and the second uplink control information.

11 Claims, 11 Drawing Sheets

(51) Int. Cl.
*H04L 1/18* (2006.01)
*H04L 5/00* (2006.01)

(52) U.S. Cl.
CPC ....... *H04L 5/0055* (2013.01); *H04W 72/0413* (2013.01); *H04W 72/0453* (2013.01)

(56) References Cited

U.S. PATENT DOCUMENTS

| | | | |
|---|---|---|---|
| 2016/0094996 A1* | 3/2016 | Xiong | H04W 16/14 370/329 |
| 2016/0174211 A1 | 6/2016 | Gao et al. | |
| 2017/0208585 A1* | 7/2017 | Han | H04W 72/1268 |
| 2017/0280440 A1* | 9/2017 | Oh | H04W 74/006 |
| 2018/0110042 A1* | 4/2018 | Chen | H04W 72/0413 |
| 2018/0279291 A1* | 9/2018 | Tiirola | H04B 1/713 |
| 2018/0302916 A1* | 10/2018 | Lee | H04L 5/0012 |
| 2018/0324787 A1* | 11/2018 | Yin | H04L 1/1861 |
| 2018/0375619 A1* | 12/2018 | Hwang | H04W 72/0446 |
| 2019/0306845 A1* | 10/2019 | Tang | H04J 1/065 |
| 2020/0036501 A1* | 1/2020 | Gao | H04W 72/0413 |
| 2020/0236700 A1* | 7/2020 | Matsumura | H04W 72/1284 |
| 2021/0022129 A1* | 1/2021 | Yuan | H04L 5/0094 |

FOREIGN PATENT DOCUMENTS

| | | |
|---|---|---|
| CN | 105187172 A | 12/2015 |
| WO | 2017048215 A1 | 3/2017 |

\* cited by examiner

| Retransmission 1 | Retransmission 2 | Retransmission 3 | Retransmission 4 |

METHOD FOR SENDING CONTROL INFORMATION, METHOD FOR RECEIVING CONTROL INFORMATION, AND APPARATUS

CROSS-REFERENCE TO RELATED APPLICATIONS

This application is a continuation of International Application No. PCT/CN2018/090886, filed on Jun. 12, 2018, which claims priority to Chinese Patent Application No. 201710454090.5, filed on Jun. 15, 2017. The disclosures of the aforementioned applications are hereby incorporated by reference in their entireties.

TECHNICAL FIELD

Embodiments of the present invention relate to the field of communication technologies, and in particular, to a method for sending control information, a method for receiving control information, and an apparatus.

BACKGROUND

Currently, uplink control information to be sent by user equipment (UE) has a physical uplink control channel (PUCCH) resource corresponding thereto. For example, for a hybrid automatic repeat request-acknowledgement (HARQ-ACK), a base station allocates a PUCCH resource corresponding to the HARQ-ACK, and for periodic channel state information (CSI), the base station also allocates a PUCCH resource corresponding to the periodic CSI, so that regardless of whether UE sends a plurality of types of uplink control information in one uplink subframe or sends different pieces of uplink control information in different uplink subframes, the UE can separately send the uplink control information on PUCCH resources allocated for the corresponding pieces of uplink control information.

In this case, if UE sends a plurality of types of uplink control information, the UE separately performs discrete Fourier transform (DFT) on uplink control information sent on different PUCCH resources. Consequently, peak to average power ratios (PAPR) of signals sent by the UE in an uplink subframe are relatively large, leading to low power efficiency of the UE. On the other hand, intermodulation interference (IMI) between signals sent on different PUCCH resources also leads to relatively poor receiving performance of the uplink control information.

SUMMARY

Embodiments of the present invention provide a method for sending control information, a method for receiving control information, and an apparatus, to provide a manner of determining a resource for transmitting a PUCCH.

According to a first aspect, a method for sending control information is provided, and the method may be performed by a terminal device. The method includes: determining, by the terminal device, a target uplink control channel in a first uplink control channel and a second uplink control channel, where the first uplink control channel corresponds to first uplink control information, and the second uplink control channel corresponds to second uplink control information; and sending, by terminal device, target uplink control information on the target uplink control channel, where the target uplink control information includes the first uplink control information and the second uplink control information.

According to a second aspect, a method for receiving control information is provided, and the method may be performed by a network device, and the network device is, for example, a base station. The method includes: determining, by the network device, a target uplink control channel in a first uplink control channel and a second uplink control channel, where the first uplink control channel corresponds to first uplink control information, and the second uplink control channel corresponds to second uplink control information; and receiving, by the network device on the target uplink control channel, target uplink control information sent by a terminal device, where the target uplink control information includes the first uplink control information and the second uplink control information.

According to a third aspect, a control channel determining method is provided. The method includes: determining, by a terminal device, a target uplink control channel in a first uplink control channel and a second uplink control channel, where the first uplink control channel corresponds to first uplink control information, and the second uplink control channel corresponds to second uplink control information; and mapping, by the terminal device, target uplink control information to the target uplink control channel, where the target uplink control information includes the first uplink control information and the second uplink control information.

According to a fourth aspect, a control channel determining method is provided. The method includes: determining, by a network device, a target uplink control channel in a first uplink control channel and a second uplink control channel, where the first uplink control channel corresponds to first uplink control information, and the second uplink control channel corresponds to second uplink control information; and decoding, by the network device, target uplink control information on the target uplink control channel, where the target uplink control information includes the first uplink control information and the second uplink control information.

In the embodiments of the present invention, if the terminal device needs to transmit two pieces of uplink control information, the terminal device selects one from uplink control channels respectively corresponding to the two pieces of uplink control information as the target uplink control channel, and sends the two pieces of uplink control information through the target uplink control channel. For example, if the uplink control channel is a PUCCH, in the embodiments of the present invention, a plurality of pieces of uplink control information are sent in one PUCCH resource. In this way, PAPRs of signals sent by the terminal device in an uplink subframe can be reduced, and power efficiency of the terminal device can be improved. On the other hand, because the plurality of pieces of uplink control information are sent through one target uplink control channel, IMD between signals is reduced, so that receiving performance of the uplink control information can be enhanced.

In a possible design, the determining, by a terminal device, a target uplink control channel in a first uplink control channel and a second uplink control channel includes: determining, by the terminal device, the target uplink control channel in the first uplink control channel and the second uplink control channel based on a capacity of the first uplink control channel and a capacity of the second uplink control channel. Correspondingly, the determining, by a network device, a target uplink control channel in a first uplink control channel and a second uplink control channel includes: determining, by the network device, the target uplink control channel in the first uplink control channel and the second uplink control channel based on a capacity of the first uplink control channel and a capacity of the second uplink control channel, where the target uplink control channel is an uplink control channel having a greater capacity in the first uplink control channel and the second uplink control channel.

In the embodiments of the present invention, the terminal device can determine the target uplink control channel in the first uplink control channel and the second uplink control channel in a plurality of different manners. One of the manners is that the terminal device determines the target uplink control channel based on a capacity of the uplink control channel. Because in the embodiments of the present invention, it is desired to send first uplink control information and second uplink control information on one uplink control channel, the target uplink control channel having a greater capacity carries more information, and integrity of the first uplink control information and the second uplink control information can be better ensured. Making a selection based on a capacity can satisfy a reliability requirement of a service as much as possible.

In a possible design, the determining, by a terminal device, a target uplink control channel in a first uplink control channel and a second uplink control channel includes: determining, by the terminal device, the target uplink control channel based on a service type corresponding to the first uplink control information, an end moment of the first uplink control channel, and an end moment of the second uplink control channel. Correspondingly, the determining, by a network device, a target uplink control channel in a first uplink control channel and a second uplink control channel includes: determining, by the network device, the target uplink control channel based on a service type corresponding to the first uplink control information, an end moment of the first uplink control channel, and an end moment of the second uplink control channel.

If the first uplink control information is control information corresponding to a first-type service, and the end moment of the first uplink control channel is the same as the end moment of the second uplink control channel, the target uplink control channel is an uplink control channel having a greater capacity in the first uplink control channel and the second uplink control channel.

If the first uplink control information is control information corresponding to a first-type service, and a difference between the end moment of the first uplink control channel and the end moment of the second uplink control channel is less than or equal to a first threshold, the target uplink control channel is an uplink control channel having a greater capacity in the first uplink control channel and the second uplink control channel.

If the first uplink control information is control information corresponding to a first-type service, and the end moment of the first uplink control channel is different from the end moment of the second uplink control channel, the target uplink control channel is an uplink control channel having an earlier end moment in the first uplink control channel and the second uplink control channel.

If the first uplink control information is control information corresponding to a first-type service, and a difference between the end moment of the first uplink control channel and the end moment of the second uplink control channel is greater than a first threshold, the target uplink control channel is an uplink control channel having an earlier end moment in the first uplink control channel and the second uplink control channel.

A service latency of the first-type service is less than or equal to a preset latency threshold, and/or a service bit error rate of the first-type service is less than or equal to a preset bit error rate threshold.

Determining a target uplink control channel based on a service type of uplink control information and an end moment of an uplink control channel is another manner of determining the target uplink control channel.

Different uplink control information may have different latency requirements. For example, a service latency of the first-type service is less than or equal to a preset latency threshold, and/or a service bit error rate of the first-type service is less than or equal to a preset bit error rate threshold. That is, the first-type service has a higher latency requirement. Therefore, uplink control information corresponding to this type of service needs to be transmitted to the network device in time, to satisfy a reliability requirement of the service. Therefore, if a selection is made based on only capacities, possibly, latency requirements cannot be satisfied sometimes. In view of this, in the embodiments of the present invention, when the target uplink control channel is selected, a service type and time information that correspond to the uplink control information may also be considered. When the time information is considered, an end moment of the uplink control channel may be considered.

If the end moment of the first uplink control channel is the same as the end moment of the second uplink control channel, or the difference between the end moment of the first uplink control channel and the end moment of the second uplink control channel is less than or equal to a first threshold, indicating a relatively small difference between the end moments of the two uplink control channels, regardless of which uplink control channel is selected as the target uplink control channel, the uplink control information corresponding to the first-type service is not much affected, that is, transmission latencies are almost the same. In this case, the terminal device may also select the target uplink control channel with reference to a further factor. For example, the terminal device can select, out of consideration for complete transmission of the uplink control information, an uplink control channel having a greater capacity in the first uplink control channel and the second uplink control channel as the target uplink control channel, to ensure as much as possible that both the first uplink control information and the second uplink control information can be completely transmitted, thereby preventing information from being discarded.

Alternatively, if the difference between the end moment of the first uplink control channel and the end moment of the second uplink control channel is greater than a first threshold, it indicates that if an uplink control channel having a later end moment is selected as the target uplink control channel, sending uplink control information corresponding to the first-type service through such a target uplink control channel may fail to satisfy the latency requirement of the first-type service. Therefore, if the difference between the end moment of the first uplink control channel and the end moment of the second uplink control channel is greater than the first threshold, the terminal device determines to select an uplink control channel having an earlier end moment in the first uplink control channel and the second uplink control channel as the target uplink control channel. By determining the difference between the end moment of the first uplink control channel and the end moment of the second uplink control channel, the terminal device is enabled to select the target uplink control channel more accurately.

Alternatively, for example, the first-type service is a URLLC service. Because the URLLC service has a relatively high latency requirement due to service urgency, uplink control information transmitted on a PUCCH includes HARQ-ACK information corresponding to downlink URLLC data. If the HARQ-ACK information is a NACK, the network device needs to retransmit the previous downlink URLLC data to the terminal device based on the NACK information, to help a downlink URLLC service satisfy a specified reliability requirement while satisfying a specified latency requirement. If the HARQ-ACK information is an ACK, the network device can determine that the downlink URLLC data sent to the terminal device has been correctly received on a terminal device side. It can be learned that if information carried in the PUCCH includes the HARQ-ACK, if the uplink control channel is selected based on only capacities, then if a selected target uplink control channel has a later end moment, sending the HARQ-ACK on the uplink control channel having the later end moment may affect service requirements for a low latency and high reliability of the downlink URLLC service and an uplink URLLC service. Therefore, only if one piece of uplink control information in the first uplink control information and the second uplink control information corresponds to first-type service information, and the end moment of the first uplink control channel is different from the end moment of the second uplink control channel, the terminal device can select an uplink control channel having an earlier end moment from the first uplink control channel and the second uplink control channel as the target uplink control channel, to satisfy, in this manner as much as possible, a latency requirement of the first-type service.

In a possible design, the determining, by a terminal device, a target uplink control channel in a first uplink control channel and a second uplink control channel includes: determining, by the terminal device, the target uplink control channel in the first uplink control channel and the second uplink control channel based on a service type corresponding to first uplink control information, a capacity of the first uplink control channel, and a capacity of the second uplink control channel. Correspondingly, determining, by a network device, a target uplink control channel in a first uplink control channel and a second uplink control channel includes: determining, by the network device, the target uplink control channel in the first uplink control channel and the second uplink control channel based on a service type corresponding to first uplink control information, a capacity of the first uplink control channel, and a capacity of the second uplink control channel. If the first uplink control information is control information corresponding to a first-type service, the target uplink control channel is an uplink control channel having a greater capacity in the first uplink control channel and the second uplink control channel. A service latency of the first-type service is less than or equal to a preset latency threshold, and/or a service bit error rate of the first-type service is less than or equal to a preset bit error rate threshold.

Selecting a target uplink control channel based on a service type corresponding to uplink control information and capacities of uplink control channels is another manner of selecting the target uplink control channel. There is a reliability requirement of the first-type service. Therefore, to ensure complete transmission of information as much as possible, an uplink control channel having a greater capacity in the first uplink control channel and the second uplink control channel may be directly selected as the target uplink control channel, thereby preventing information from being discarded.

In a possible design, the first uplink control channel and the second uplink control channel overlap in time. In this case, the determining, by a terminal device, a target uplink control channel in a first uplink control channel and the second uplink control channel includes: determining, by the terminal device, the target uplink control channel based on an end moment of the first uplink control channel and an end moment of the second uplink control channel. Correspondingly, determining, by a network device, a target uplink control channel in a first uplink control channel and a second uplink control channel includes: determining, by the network device, the target uplink control channel based on an end moment of the first uplink control channel and an end moment of the second uplink control channel.

The target uplink control channel is an uplink control channel having an earlier end moment in the first uplink control channel and the second uplink control channel; if a difference between the end moment of the first uplink control channel and the end moment of the second uplink control channel is greater than a first threshold, the target uplink control channel is an uplink control channel having an earlier end moment in the first uplink control channel and the second uplink control channel; or if a difference between the end moment of the first uplink control channel and the end moment of the second uplink control channel is less than or equal to a first threshold, the target uplink control channel is the first uplink control channel or the second uplink control channel.

Regardless of which type of uplink control information is transmitted, naturally, a smaller latency is better. Therefore, even if service types of the first uplink control information and the second uplink control information are not considered, the terminal device can also select the target uplink control channel based on time information of the uplink control channel. For example, the terminal device may directly select an uplink control channel having an earlier end moment in the first uplink control channel and the second uplink control channel as the target uplink control channel, to reduce a transmission latency as much as possible.

Alternatively, the terminal device may consider a difference between an end moment of the first uplink control channel and an end moment of the second uplink control channel. If the difference between the end moment of the first uplink control channel and the end moment of the second uplink control channel is greater than a first threshold, it indicates that if an uplink control channel having a later end moment is selected as the target uplink control channel, sending uplink control information through such a target uplink control channel may lead to a higher transmission latency of the uplink control information. Consequently, a latency requirement of a service or a system cannot be satisfied. Therefore, if the difference between the end moment of the first uplink control channel and the end moment of the second uplink control channel is greater than the first threshold, the terminal device determines to select an uplink control channel having an earlier end moment in the first uplink control channel and the second uplink control channel as the target uplink control channel. However, if the difference between the end moment of the first uplink control channel and the end moment of the second uplink control channel is less than or equal to the first threshold, indicating a relatively small difference between the end moments of the two uplink control channels, regardless of which uplink control channel is selected as the target uplink control channel, the uplink control information corresponding to a first-type service is not much affected, that is, transmission latencies may be almost the same. In this case, the terminal device may select the target uplink control channel with reference to a further factor. For example, the terminal device may randomly select the first uplink control channel or the second uplink control channel as the target uplink control channel. Alternatively, because regardless of which uplink control channel is selected, a latency requirement can basically be met, the terminal device can select, out of consideration for complete transmission of the uplink control information, an uplink control channel having a greater capacity in the first uplink control channel and the second uplink control channel as the target uplink control channel, to ensure as much as possible that both the first uplink control information and the second uplink control information can be completely transmitted, thereby preventing information from being discarded. Certainly, the terminal device may alternatively select the target uplink control channel in the first uplink control channel and the second uplink control channel with reference to another factor. This is not limited in the embodiments of the present invention.

In a possible design, the first uplink control channel and the second uplink control channel overlap in time. In this case, the determining, by a terminal device, a target uplink control channel from the first uplink control channel and the second uplink control channel includes: determining, by the terminal device, the target uplink control channel based on a start moment of the first uplink control channel and a start moment of the second uplink control channel, and/or based on an end moment of the first uplink control channel and an end moment of the second uplink control channel. Correspondingly, the determining, by a network device, a target uplink control channel in a first uplink control channel and a second uplink control channel includes: determining, by the network device, the target uplink control channel based on a start moment of the first uplink control channel and a start moment of the second uplink control channel, and/or based on an end moment of the first uplink control channel and an end moment of the second uplink control channel, where if the end moment of the second uplink control channel is earlier than the end moment of the first uplink control channel, and a difference between the start moment of the second uplink control channel and the start moment of the first uplink control channel is less than a second threshold, the target uplink control channel is the second uplink control channel; or if the end moment of the second uplink control channel is later than the end moment of the first uplink control channel, or if the end moment of the second uplink control channel is earlier than the end moment of the first uplink control channel, and a difference between the start moment of the second uplink control channel and the start moment of the first uplink control channel is greater than or equal to a second threshold, the target uplink control channel is the first uplink control channel.

In the embodiments of the present invention, the terminal device not only can select the target uplink control channel with reference to the difference between the end moment of the first uplink control channel and the end moment of the second uplink control channel, but also can select the target uplink control channel with reference to the difference between the start moment of the first uplink control channel and the start moment of the second uplink control channel.

If the end moment of the second uplink control channel is earlier than the end moment of the first uplink control channel, and the difference between the start moment of the second uplink control channel and the start moment of the first uplink control channel is less than a second threshold, it indicates that a difference between the first uplink control channel and the second uplink control channel is relatively small. Possibly, neither of the uplink control channels starts too early, so that neither of the uplink control channels is likely to start transmission or complete transmission before the terminal device obtains the uplink control information. In this case, the terminal device can select an uplink control channel having an earlier end moment in the two uplink control channels. To be specific, if transmission of the uplink control information is ensured, a transmission latency can be reduced as much as possible by selecting an uplink control channel having an earlier end moment.

However, if the end moment of the second uplink control channel is earlier than the end moment of the first uplink control channel, and a difference between the start moment of the second uplink control channel and the start moment of the first uplink control channel is greater than or equal to a second threshold, it indicates that a difference between the first uplink control channel and the second uplink control channel is relatively large. If an uplink control channel having an earlier start moment is selected as the target uplink control channel, possibly, transmission of the target uplink control channel may have been started or completed before the terminal device demodulates downlink data or completes demodulation of downlink data. Consequently, the uplink control information generated by the terminal device cannot be completely transmitted or even cannot be transmitted. Therefore, in this case, the uplink control channel having a later end moment may be selected as the target uplink control channel whenever possible because if the end moment is later, more time can be spent to wait for the terminal device to demodulate the downlink data, to ensure as much as possible that the uplink control information can be transmitted.

In a possible design, the first uplink control information is hybrid automatic repeat request-acknowledgement information, and the second uplink control information is first-type channel state information; or the first uplink control information is second-type channel state information, and the second uplink control information is first-type channel state information; or the first uplink control information is first-type scheduling request information, and the second uplink control information is any one of hybrid automatic repeat request-acknowledgement information, first-type channel state information and second-type channel state information.

Implementations of the first uplink control information and the second uplink control information are provided, and certainly, the embodiments of the present invention are not limited to the implementations.

In a possible design, the first-type channel state information is periodic channel state information, the second-type channel state information is low latency channel state information, the first-type scheduling request information is a scheduling request used to request for serving of the first-type service, and a service latency of the first-type service is less than or equal to a preset latency threshold, and/or a service bit error rate of the first-type service is less than or equal to a preset bit error rate threshold.

In a possible design, before the terminal device sends the target uplink control information on the target uplink control channel, the method further includes: receiving, by the terminal device, configuration information, where the configuration information is used to indicate that the terminal device is allowed to simultaneously transmit the first uplink control information and the second uplink control information. Correspondingly, the network device further sends the configuration information to the terminal device, where the configuration information is used to indicate that the terminal device is allowed to simultaneously transmit the first uplink control information and the second uplink control information.

After receiving the configuration information, the terminal device can determine that the first uplink control information and the second uplink control information can be simultaneously transmitted, so that the terminal device can select the target uplink control channel in the manner as described above. However, if the network device does not send the configuration information to the terminal device, the terminal device may choose to send the first uplink control information on the first uplink control channel and send the second uplink control information on the second uplink control channel, that is, send corresponding pieces of uplink control information on the uplink control channels respectively. Alternatively, if the network device does not send the configuration information to the terminal device, the terminal device may select one uplink control channel in the first uplink control channel and the second uplink control channel to send the first uplink control information or the second uplink control information. With regard to choosing to send the first uplink control information or the second uplink control information, a choosing manner is not limited in the embodiments of the present invention.

In a possible design, the target uplink control information includes N-bit information having a highest priority in the first uplink control information and the second uplink control information. N is less than or equal to a quantity of bits corresponding to the capacity of the target uplink control channel.

To be specific, the target uplink control information sent by the terminal device needs to adapt to the capacity of the target uplink control channel. The N-bit information may be N-bit information included in the first uplink control information, or may be N-bit information included in the second uplink control information. Alternatively, the N-bit information may include entire content of the first uplink control information and partial content of the second uplink control information, or the N-bit information may include entire content of the second uplink control information and partial content of the first uplink control information. That is, if a total capacity of the first uplink control information and the second uplink control information is less than or equal to the capacity of the target uplink control channel, the terminal device can completely send the first uplink control information and the second uplink control information, to ensure integrity of the information. However, if a total capacity of the first uplink control information and the second uplink control information is greater than the capacity of the target uplink control channel, the terminal device may choose to send N-bit information having a highest priority in the first uplink control information and the second uplink control information, to ensure as much as possible that information having a high priority can be sent.

According to a fifth aspect, a terminal device is provided. The terminal device has functions for implementing the terminal device in the foregoing method designs. The functions may be implemented by using hardware, or may be implemented by using hardware by executing corresponding software. The hardware or the software includes one or more units corresponding to the foregoing functions.

In a possible design, a specific structure of the terminal device may include a processor and a transmitter. Optionally, the terminal device may further include a receiver. The processor, the transmitter, and the receiver can perform corresponding functions in the method according to the first aspect or any possible design of the first aspect.

According to a sixth aspect, a network device is provided. The network device has functions for implementing the network device in the foregoing method designs. The functions may be implemented by using hardware, or may be implemented by using hardware by executing corresponding software. The hardware or the software includes one or more units corresponding to the foregoing functions.

In a possible design, a specific structure of the network device may include a processor and a receiver. Optionally, the network device may further include a transmitter. The processor, the transmitter, and the receiver can perform corresponding functions of the method according to the second aspect or any possible design of the second aspect.

According to a seventh aspect, a communication apparatus is provided. The communication apparatus may be the terminal device in the foregoing method designs, or may be a functional module, such as a chip, disposed in a terminal device. The communication apparatus includes: a memory, configured to store computer executable program code, a communication interface, and a processor, coupled to the memory and the communication interface, where the program code stored in the memory includes an instruction, and when the processor executes the instruction, the instruction enables the communication apparatus to perform the method performed by the terminal device in the first aspect or any possible design of the first aspect.

According to an eighth aspect, a communication apparatus is provided. The communication apparatus may be the network device in the foregoing method designs, or may be a functional module, such as a chip, disposed in a network device. The communication apparatus includes: a memory, configured to store computer executable program code, a communication interface, and a processor, coupled to the memory and the communication interface, where the program code stored in the memory includes an instruction, and when the processor executes the instruction, the instruction enables the communication apparatus to perform the method performed by the network device in the second aspect or any possible design of the second aspect.

According to a ninth aspect, a computer storage medium is provided, configured to store a computer software instruction used by the communication apparatus described in the fifth aspect and the communication apparatus described in the seventh aspect, and including a program that is designed for the terminal device and that is used for execution in the first aspect, any possible design of the first aspect, the third aspect or any possible design of the third aspect.

According to a tenth aspect, a computer storage medium is provided, configured to store a computer software instruction used by the communication apparatus described according to the sixth aspect and the communication apparatus described according to the eighth aspect, and including a program that is designed for the terminal device and that is used for execution in the second aspect, any possible design of the second aspect, the fourth aspect or any possible design of the fourth aspect.

According to an eleventh aspect, a computer program product including an instruction is provided. When the computer program product is run on a computer, the computer is enabled to execute a program designed for the terminal device in the first aspect or any possible design of the first aspect or in the third aspect or any possible design of the third aspect.

According to a twelfth aspect, a computer program product including an instruction is provided. When the computer program product is run on a computer, the computer is enabled to execute a program designed for the network device in the second aspect or any possible design of the second aspect or in the fourth aspect or any possible design of the fourth aspect.

In the embodiments of the present invention, the terminal device can send a plurality of pieces of uplink control information on a target uplink control channel. In this way, PAPRs of signals sent by the terminal device in an uplink subframe are reduced, and power efficiency of the terminal device is improved. On the other hand, because the plurality of pieces of uplink control information are sent through one target uplink control channel, IMD between signals is reduced, so that receiving performance of the uplink control information can be enhanced.

DETAILED DESCRIPTION OF ILLUSTRATIVE EMBODIMENTS

Figures 1A, 1B:
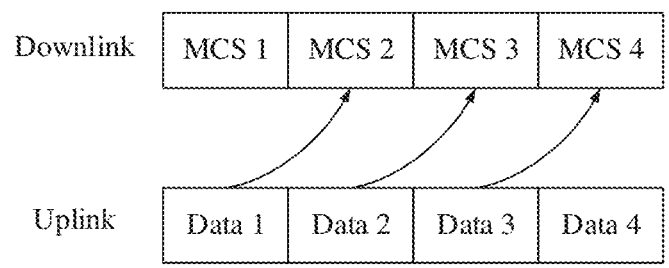
FIG. 1A is a schematic diagram of retransmitted data.
FIG. 1B is a schematic diagram of adjusting an MCS by using LL-CSI.

To make the objectives, technical solutions, and advantages of the embodiments of the present invention clearer, the following further describes the embodiments of the present invention in detail with reference to the accompanying drawings.

In the following, some terms of the embodiments of the present invention are described, to help persons skilled in the art have a better understanding.

1. A terminal device includes a device that provides a user with voice and/or data connectivity, for example, may include a handheld device with a wireless connection function, or a processing device connected to a wireless modem. The terminal device may communicate with a core network by using a radio access network (RAN), and exchange voice and/or data with the RAN. The terminal device may include user equipment (UE), a wireless terminal device, a mobile terminal device, a subscriber unit, a subscriber station, a mobile station, a mobile, a remote station, an access point (AP), a remote terminal, an access terminal, a user terminal, a user agent, a user device, or the like. For example, the terminal device may include a mobile phone (or referred to as a "cellular" phone), a computer having a mobile terminal device, a portable, a pocket-sized, a handheld, a computer-built-in, or an in-vehicle mobile apparatus, an intelligent wearable device, or the like. For example, the terminal device may include a device such as a personal communication service (PCS) phone, a cordless telephone set, a session initiation protocol (SIP) phone, a wireless local loop (WLL) station, or a personal digital assistant (PDA), a smartwatch, a smart helmet, smart glasses, or a smart band. The terminal device may further include a restricted device, for example, a device having relatively low power consumption, a device having a limited storage capacity, or a device having a limited computing capacity. For example, the terminal device may include an information sensing device such as a barcode, radio frequency identification (RFID), a sensor, a global positioning system (GPS), or a laser scanner.

2. A network device, for example, including a base station (for example, an access point), may be a device that communicates with a wireless terminal device over an air interface through one or more cells in an access network. The base station may be configured to mutually convert a received over-the-air frame and an Internet Protocol (IP) packet and serve as a router between the terminal device and a rest portion of the access network, where the rest portion of the access network may include an IP network. The base station may coordinate attribute management of the air interface. For example, the base station may include an evolved NodeB (NodeB or eNB or e-NodeB) in an LTE system or an LTE-advanced system (LTE-A), or may include a next generation NodeB (gNB) in a new radio (NR) system in fifth generation (5G) mobile communication technology. This is not limited in the embodiments of the present invention.

3. An uplink control channel is a channel carrying information that includes uplink control information. A specific channel included in the uplink control channel is not limited in this specification. For example, the uplink control channel may include a PUCCH, or an enhanced physical uplink control channel (EPDCCH), or may include another uplink control channel configured to transmit control information.

4. Low latency channel state information (LL-CSI).

To satisfy a reliability requirement while satisfying a strict latency requirement, a technology of a plurality of repeated retransmissions is provided. As shown in FIG. 1A, a quantity of needed retransmissions and a modulation and coding scheme are determined based on channel quality before data is sent, and reliability gains are obtained through four repeated transmissions. In theory, on a white noise channel, each time the data transmission is repeated, reliability is improved by 3 dB. A quantity of repetitions may be configured in advance, or may be terminated by an ACK feedback. However, if a same modulation and coding scheme (MCS) is used in a plurality of repeated transmissions, a case that channel quality changes with time cannot be dealt with, and as a result, an effect of improving reliability by repeated transmissions is weakened. Therefore, a manner of feeding back a channel state is shown in FIG. 1B. After receiving retransmitted (e.g., repetition) data, the terminal device feeds back LL-CSI to the network device, and then, the network device adjusts the MCS.

The LL-CSI is generated by the terminal device, after receiving downlink data, based on a demodulation reference signal corresponding to the downlink data, and is channel quality information that can be quickly obtained and fed back by the terminal device without performing data demodulation and decoding on the downlink data. The LL-CSI is triggered by receiving, by the terminal device, the downlink data, and the LL-CSI is measured based on the demodulation reference signal corresponding to the downlink data. Before performing data demodulation and decoding on the downlink data, the terminal device can feed back the LL-CSI to the network device, so that the network device can adjust a scheduling manner of the downlink data in time during a subsequent repeated transmission or retransmission. In particular, for ultra-reliable and low latency communications (URLLC) data, the LL-CSI can meet requirements for a low latency and high reliability of the URLLC data. For example, the LL-CSI may be an offset of the MCS relative to an MCS previously used by the terminal device, or may be an offset of channel quality indicator (CQI) relative to a CQI previously reported by the terminal device.

5. The terms "system" and "network" may be used interchangeably in the embodiments of the present invention. The term "a plurality of" means two or more. In view of this, the term "a plurality of" may also be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

Moreover, unless oppositely stated, ordinal numbers, such as "first" and "second", mentioned in the embodiments of the present invention are used to differentiate a plurality of objects, and are not intended to limit a sequence, a time sequence, a priority, or importance of the plurality of objects.

The foregoing describes some concepts included in the embodiments of the present invention, and the following describes technical background of the embodiments of the present invention.

An NR system supports a plurality of subcarrier spacings to adapt to different service requirements. In a frequency domain, a calculation manner of a subcarrier spacing supported by the NR system is $f_{sc}=f_o*2^m$, where $f_o=15$ kHz, and m is an integer. In a time domain, some time units are provided as follows, and include the following.

A subframe, where a length of one subframe is 1 ms, includes: 14 orthogonal frequency division multiplexing (OFDM) symbols in a structure (numerology) having a subcarrier spacing of 15 kHz. In one subframe, symbol boundaries of various numerologies each having a subcarrier spacing of 15 kHz or higher are aligned. Unless particularly stated, each "symbol" below refers to an OFDM symbol.

A slot is a time length of a possible scheduling unit. One slot includes y symbols in a currently used numerology. One subframe includes an integer quantity of slots. For example, when a subcarrier spacing is lower than 60 kHz, y=7, and when the subcarrier spacing is higher than 60 kHz, y=14.

A mini-slot is a minimum time length of a scheduling unit. A quantity of OFDM symbols included in one mini-slot may be smaller than a quantity of y symbols in the currently used numerology.

Figure 2A:
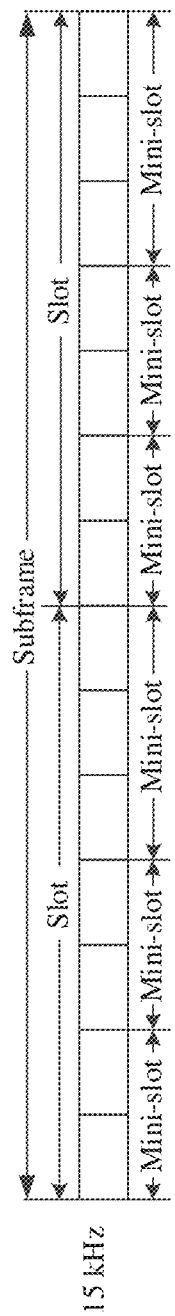
FIG. 2A is a schematic diagram of a subframe, a slot, and a mini-slot when a subcarrier spacing is 15 kHz.
Figure 2B:
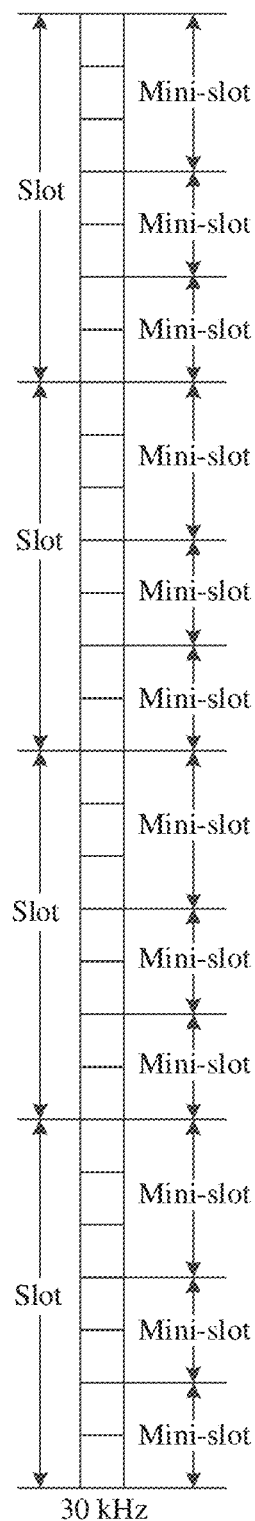
FIG. 2B is a schematic diagram of a slot and a mini-slot when a subcarrier spacing is 30 kHz.
Figure 2C:
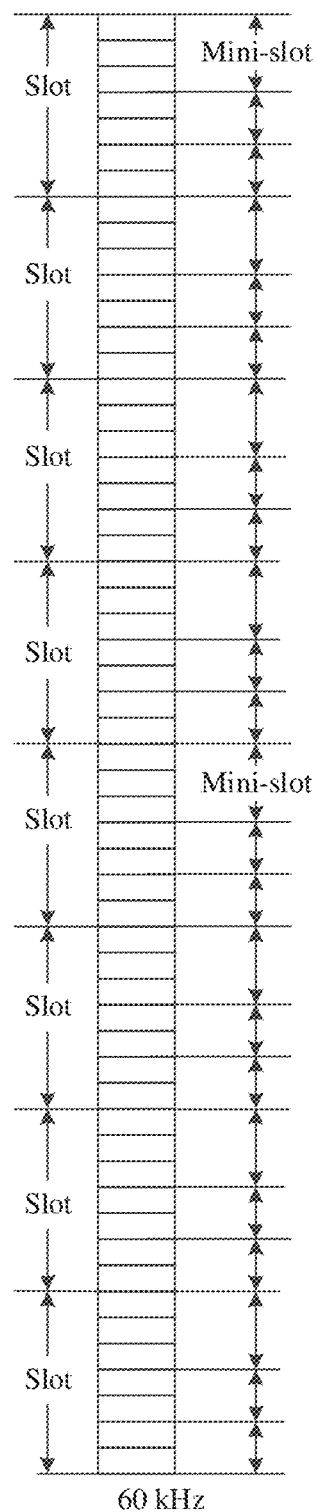
FIG. 2C is a schematic diagram of a slot and a mini-slot when a subcarrier spacing is 60 kHz.

Referring to FIG. 2A, FIG. 2B and FIG. 2C, FIG. 2A is a schematic diagram of a subframe, a slot and a mini-slot when a subcarrier spacing is 15 kHz; FIG. 2B is a schematic diagram of a slot and a mini-slot when a subcarrier spacing is 30 kHz; and FIG. 2C is a schematic diagram of a slot and a mini-slot when a subcarrier spacing is 60 kHz.

The terminal device can send uplink control information (UCI) to the network device. Specifically, the terminal device sends the UCI to the network device through an uplink control channel configured by the network device. Using an example in which the uplink control channel is a PUCCH, in an NR system, to ensure efficiency of PUCCH transmission, it is necessary to configure PUCCH resources in different formats or at different quantities for the terminal device.

The UCI includes, for example, a HARQ-ACK, periodic CSI, a scheduling request (SR), LL-CSI, and the like.

First, a case in which the UCI includes a HARQ-ACK is described. Currently, downlink data transmission is scheduled based on a base station. A specific scheduling process is as follows: The base station sends a downlink control channel, for example, a physical downlink control channel (PDCCH) or an enhanced physical downlink control channel (EPDCCH). The downlink control channel can carry scheduling information of a physical downlink shared channel (PDSCH) or a PUSCH, and the scheduling information includes, for example, control information such as resource allocation information or a modulation and coding scheme. The terminal device detects the downlink control channel, and receives a downlink data channel or sends an uplink data channel based on the scheduling information carried in the detected downlink control channel.

If the HARQ transmission is supported, after the terminal device receives the downlink data, if the data is correctly received, the terminal device feeds back a positive acknowledgement (ACK) to the base station on the PUCCH, and if the data is incorrectly received, the terminal device feeds back a negative acknowledgement (NACK) to the base station on the PUCCH. The ACK and the NACK are collectively referred to as a HARQ-ACK. If the base station receives a NACK feedback for the downlink data from the terminal device, the base station can perform retransmission scheduling on the downlink data. However, if the base station receives an ACK feedback for the downlink data from the terminal device, and the base station can suspend scheduling a downlink resource for the terminal device if no more downlink data is to be transmitted.

Subsequently, a case in which the UCI includes an SR is described. The terminal device needs to inform, through the SR, the base station whether the terminal device needs to transmit uplink data, to help the base station determine whether to allocate an uplink resource for the terminal device. After receiving the SR, the base station allocates the uplink resource to the terminal device for the terminal device to send the uplink data. If the uplink data that the terminal device needs to transmit is URLLC data, the terminal device needs to send the SR to the base station as soon as possible when there is an uplink data transmission need, and after receiving the SR of the terminal device, the base station needs to indicate, to the terminal device as soon as possible, a resource used to send the uplink data. However, for uplink data of a type other than the URLLC, a degree of urgency of sending, by the terminal device, the SR and scheduling, by the base station based on the SR, the terminal device to send the uplink data is usually lower than that of the URLLC uplink data.

Therefore, to achieve quick scheduling of URLLC data by the base station, the SR sent by the terminal device can be distinguished as a URLLC uplink data request or an uplink data request of another type (such as Enhanced Mobile Broadband (eMBB)). A distinguishing manner includes distinguishing based on content of the SR or distinguishing based on a resource used to send the SR. For example, the base station allocates, to the terminal device, a resource used to send the SR, and the terminal device sends different uplink data scheduling requests corresponding to different pieces of information on the resource. For example, if the terminal device sends "00" on the resource of the SR, it indicates that the base station is requested to schedule eMBB uplink data transmission, and if the terminal device sends "01" on the resource of the SR, it indicates that the base station is requested to schedule URLLC uplink data transmission. Alternatively, the base station allocates, to the terminal device, a resource used to send a URLLC SR, and allocates, to UE, a resource used to send an eMBB SR, so that the terminal device can determine, based on a type of the uplink data transmission, a specific resource on which the SR is sent, and the base station can distinguish a type of data corresponding to the received SR.

Subsequently, a case in which the UCI includes periodic CSI is described. The network device configures, for the terminal device, a period of feedback periodic CSI and a PUCCH resource of the feedback periodic CSI. In a carrier aggregation scenario, a feedback period of each downlink carrier is independently configured. The terminal device needs to calculate the CSI, and feeds back the CSI based on a period that is a configured parameter to the network device, so that the network device can schedule the terminal device.

Subsequently, a case in which the UCI includes LL-CSI is described. After receiving downlink data, the terminal device generates LL-CSI based on a demodulation reference signal corresponding to the downlink data, and before performing data demodulation and decoding on the downlink data, the terminal device can feed back the LL-CSI to the network device, so that the network device can adjust a scheduling manner of the downlink data in time during a subsequent repeated transmission or retransmission.

A PUCCH resource used to send the UCI by the terminal device may be a resource configured by the base station for the terminal device. The configured PUCCH resource includes at least one of a time, a frequency, a reference signal sequence, and the like that are occupied by a PUCCH. In addition, the PUCCH resource may further include a candidate value of a time interval between the PUCCH and a PDSCH or may include a candidate value of a time interval between the PUCCH and a PDCCH.

Currently, if the terminal device sends a HARQ-ACK in an uplink subframe, the UE can determine a first PUCCH resource of the uplink subframe based on a rule of determining a PUCCH resource corresponding to the HARQ-ACK, and the first PUCCH resource corresponds to information of the HARQ-ACK. If the terminal device sends periodic CSI in an uplink subframe, the UE can determine a second PUCCH resource of the uplink subframe based on a rule of determining a PUCCH resource corresponding to the periodic CSI, and the second PUCCH resource corresponds to information of the periodic CSI. If the terminal device sends an SR in an uplink subframe, the UE can determine a third PUCCH resource of the uplink subframe based on a rule of determining a PUCCH resource corresponding to the SR, and the third PUCCH resource corresponds to the SR. If the terminal device sends LL-CSI in an uplink subframe, UE can determine a fourth PUCCH resource of the uplink subframe based on a rule of determining a PUCCH resource corresponding to the LL-CSI, and the fourth PUCCH resource corresponds to information of the LL-CSI.

Therefore, if the terminal device sends at least two of a HARQ-ACK, periodic CSI, an SR, and LL-CSI in an uplink subframe, a current manner is sending them respectively on corresponding PUCCH resources. To be specific, the terminal device sends the HARQ-ACK on the first PUCCH resource, sends the periodic CSI on the second PUCCH resource, sends the SR on the third PUCCH resource, and sends the LL-CSI on the fourth PUCCH resource. However, on one hand, if the first PUCCH resource, the second PUCCH resource, the third PUCCH resource and the fourth PUCCH resource are discontinuous in frequency, and if DFT is separately performed on signals of the HARQ-ACK sent on the first PUCCH resource, the periodic CSI sent on the second PUCCH resource, the SR sent on the third PUCCH resource, and the LL-CSI sent on the fourth PUCCH resource, PAPRs of signals sent by the terminal device in the uplink subframe are relatively large, leading to low power efficiency of the terminal device. On the other hand, IMD between the signals sent on the first PUCCH resource, the second PUCCH resource, the third PUCCH resource and the fourth PUCCH resource may lead to relatively poor receiving performance of both the HARQ-ACK and the periodic CSI.

Alternatively, if the terminal device sends at least two of a HARQ-ACK, periodic CSI, an SR, and LL-CSI in an uplink subframe, an assumed manner is: The terminal device determines a PUCCH resource in a plurality of PUCCH resources based on information amounts of various pieces of to-be-fed-back UCI or types of various pieces of to-be-fed-back UCI, and feeds back all pieces of UCI in the selected PUCCH resource. For example, if the pieces of to-be-fed-back UCI of the terminal device in a same subframe include the HARQ-ACK and the periodic CSI, and if the HARQ-ACK corresponds to a HARQ-ACK of downlink data of an anchor carrier, and an information amount of the periodic CSI is CSI of one cell, the selected PUCCH resource is a PUCCH channel corresponding to the periodic CSI. If an information amount of the HARQ-ACK is greater than two bits, the selected PUCCH resource is a PUCCH channel corresponding to the HARQ-ACK. If the pieces of to-be-fed-back UCI of the terminal device in a same subframe include the HARQ-ACK and the SR, and if the HARQ-ACK corresponds to a HARQ-ACK of downlink data of an anchor carrier, the selected PUCCH resource is a PUCCH channel corresponding to the SR. If an information amount of the HARQ-ACK is greater than two bits, the selected PUCCH resource is a PUCCH channel corresponding to the HARQ-ACK, and so on.

It can be learned that in this assumed manner, when the terminal device selects the PUCCH resource, effects of selection of the selected PUCCH resource on a latency and reliability of serving of a service corresponding to the uplink control information are still not considered.

In view of this, technical solutions of the embodiments of the present invention are provided. In the embodiments of the present invention, if the terminal device needs to transmit two pieces of uplink control information, the terminal device selects one from uplink control channels respectively corresponding to the two pieces of uplink control information as the target uplink control channel, and sends the two pieces of uplink control information through the target uplink control channel. For example, if the uplink control channel is a PUCCH, in the embodiments of the present invention, a plurality of pieces of uplink control information are sent in one PUCCH resource. In this way, PAPRs of signals sent by the terminal device in an uplink subframe can be reduced, and power efficiency of the terminal device can be improved. On the other hand, because the plurality of pieces of uplink control information are sent through one target uplink control channel, IMD between signals is reduced, so that receiving performance of the uplink control information can be enhanced. The target uplink control channel is a channel having a greater capacity or a later end moment in the two uplink control channels. In this way, requirements of an ultra-reliable and low latency communications URLLC service, of which a service latency is less than or equal to a preset latency threshold, and/or a service bit error rate is less than or equal to a preset bit error rate threshold, on the uplink control information transmission can be satisfied. In the embodiments of the present invention, the uplink control channel and the uplink control channel resource can be considered as a same concept. That is, that the terminal device selects the uplink control channel may be understood as that the terminal device selects the uplink control channel resource, and that the terminal device sends the uplink control information through the uplink control channel can be understood as that the terminal device sends the uplink control information through the uplink control channel resource.

Figure 3:
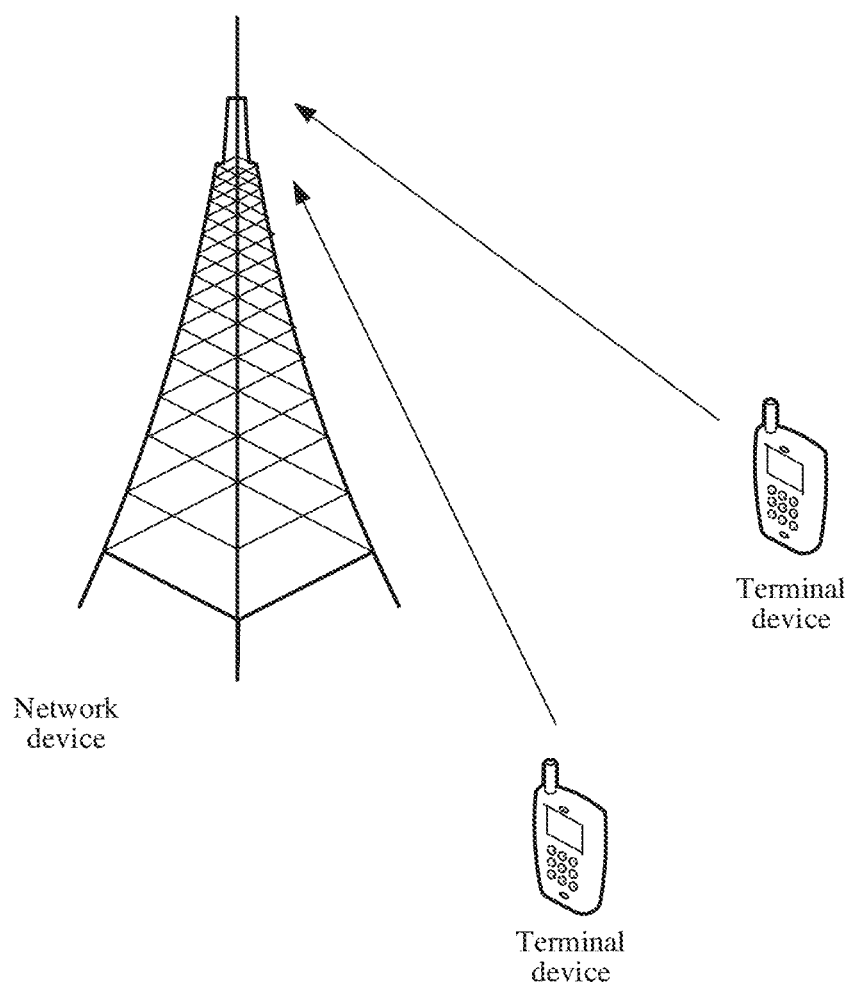
FIG. 3 is a schematic diagram of an application scenario according to an embodiment of the present invention.

Referring to FIG. 3, an application scenario according to an embodiment of the present invention is described. A network device and two terminal devices are included in the FIG. 3. The terminal device can transmit uplink control information to the network device through an uplink control channel. The network device in the FIG. 3 is, for example, a base station.

The technical solutions provided in the specification may be applied to a 5G NR system (NR system for short below), and may further be applied to a next generation mobile communication system or another similar mobile communication system.

The technical solutions provided in the embodiments of the present invention are described below with reference to the accompanying drawings.

Figure 4:
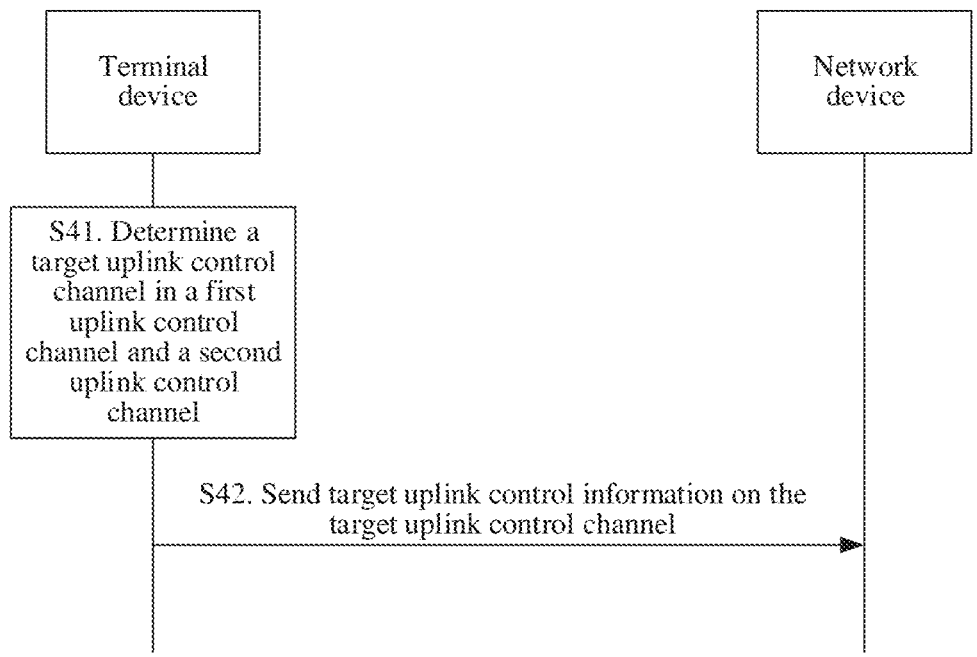
FIG. 4 is a flowchart of a control information transmission method according to an embodiment of the present invention.

Referring to FIG. 4, an embodiment of the present invention provides a method for sending control information and a method for receiving control information. In the following description, an example in which all methods provided in the embodiments of the present invention are applied to the application scenario shown in the FIG. 3, and the terminal device transmits two types of uplink control information is used. The two types of uplink control information transmitted by the terminal device include first uplink control information and second uplink control information.

S41. The terminal device determines a target uplink control channel in a first uplink control channel and a second uplink control channel. The first uplink control channel corresponds to the first uplink control information, and the second uplink control channel corresponds to the second uplink control information. That the first uplink control channel corresponds to the first uplink control information herein means that the first uplink control channel is allocated by the network device to the terminal device for transmitting the first uplink control information. That the second uplink control channel corresponds to the second uplink control information has a same meaning.

In this embodiment of the present invention, the first uplink control information is hybrid automatic repeat request-acknowledgement information, and the second uplink control information is first-type channel state information; or the first uplink control information is second-type channel state information, and the second uplink control information is first-type channel state information; or the first uplink control information is first-type scheduling request information, and the second uplink control information is any one of hybrid automatic repeat request-acknowledgement information, first-type channel state information, and second-type channel state information.

The first-type channel state information is periodic CSI, the second-type channel state information is LL-CSI, the first-type scheduling request information is a scheduling request used to request for serving of the first-type service, and a service latency of the first-type service is less than or equal to a preset latency threshold, and/or a service bit error rate of the first-type service is less than or equal to a preset bit error rate threshold. For example, the first-type service is a URLLC service.

Figure 5A:
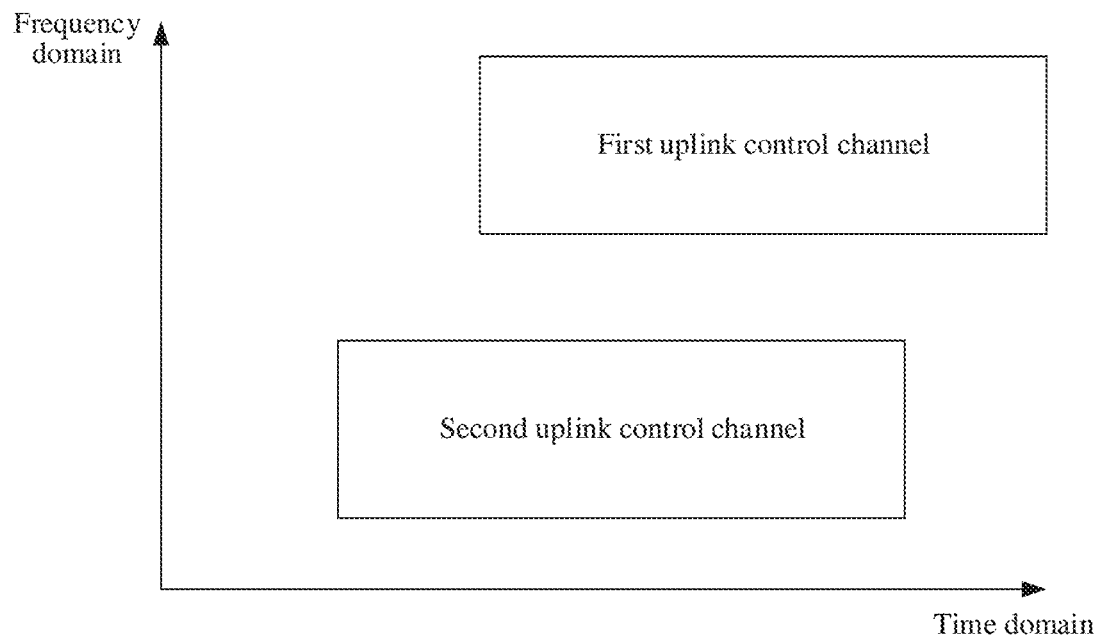
FIG. 5A to FIG. 5E is schematic diagrams of several relationships between a first uplink control channel and a second uplink control channel according to an embodiment of the present invention.
Figure 5B:
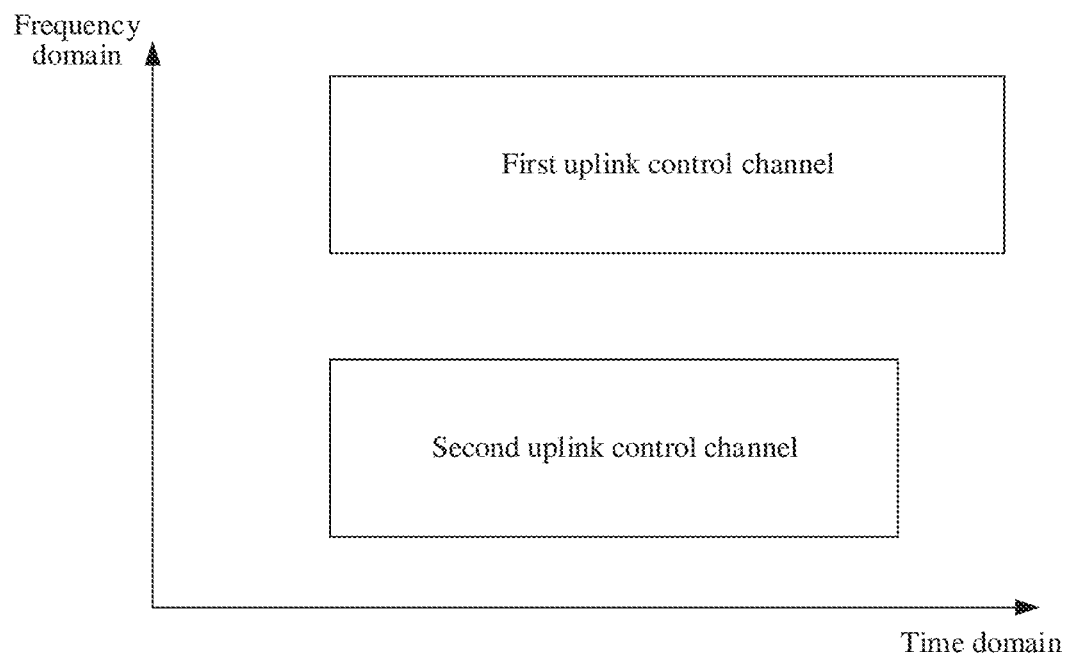
Figure 5C:
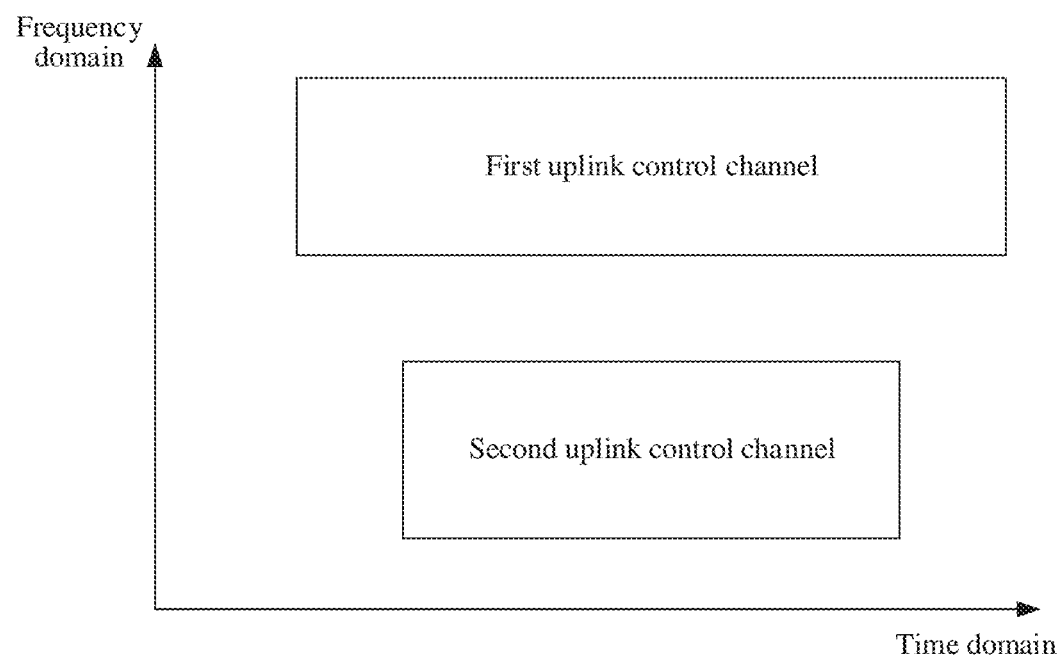
Figure 5D:
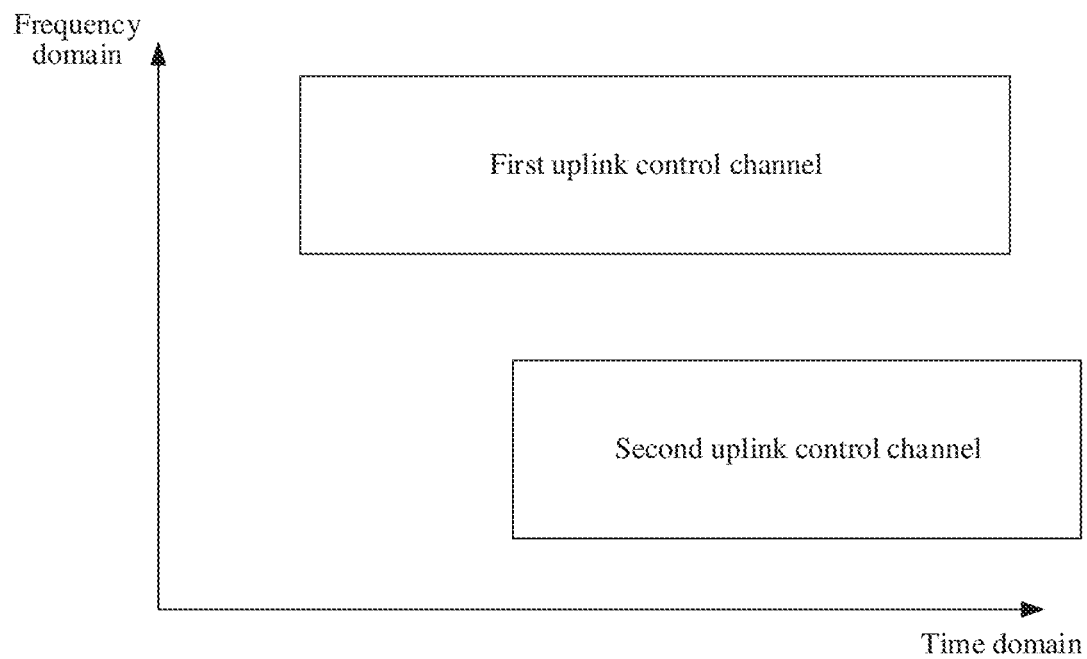
Figure 5E:
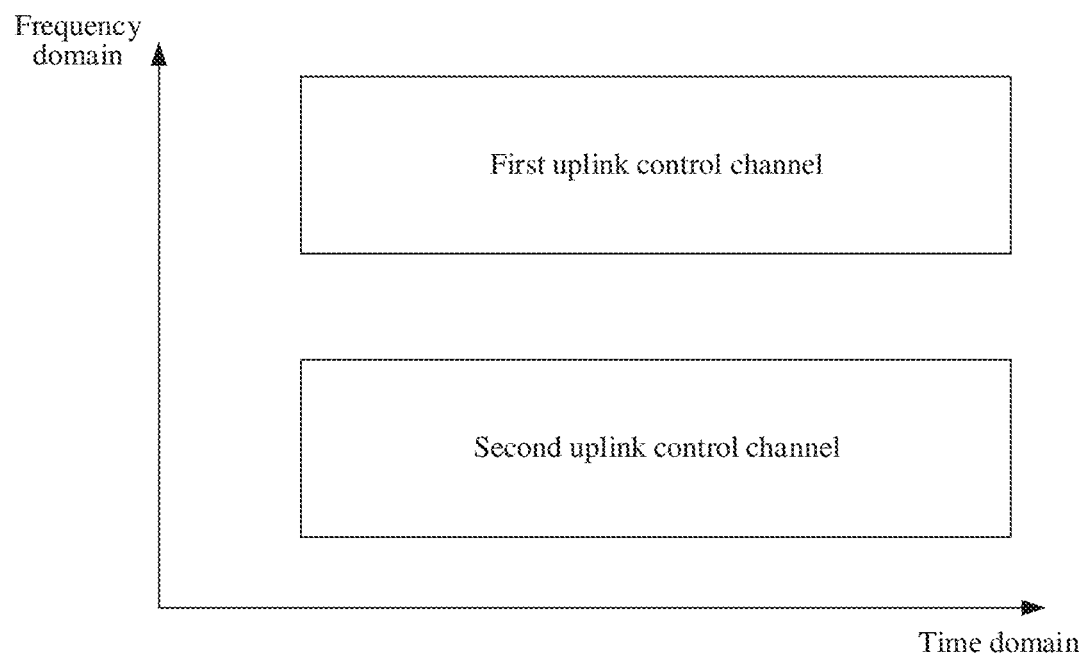

In this embodiment of the present invention, the first uplink control channel and the second uplink control channel may be uplink control channels in different formats or uplink control channels in a same format. A time length included by the first uplink control channel and a time length included by the second uplink control channel may be the same or different. However, the first uplink control channel and the second uplink control channel partially or completely overlap in time. FIG. 5A to FIG. 5D show several cases in which the first uplink control channel and the second uplink control channel partially overlap in time. In addition, FIG. 5E shows a case in which the first uplink control channel and the second uplink control channel completely overlap in time. It can be learned that a time length included in the first uplink control channel and a time length included in the second uplink control channel may be the same or different, and a start moment of the first uplink control channel and a start moment of the second uplink control channel may be the same or different. If the time length included in the first uplink control channel is different from the time length included in the second uplink control channel, the first uplink control channel and the second uplink control channel may not overlap in time or may partially overlap in time. If the time length of the first uplink control channel is shorter than the time length of the second uplink control channel, the time length of the first uplink control channel may be included in the time length of the second uplink control channel. However, if the time length included in the first uplink control channel and the time length included in the second uplink control channel are the same, and if the start moment of the first uplink control channel is different from the start moment of the second uplink control channel, the first uplink control channel and the second uplink control channel may not overlap in time or may partially overlap in time. If the start moment of the first uplink control channel is the same as the start moment of the second uplink control channel, the first uplink control channel and the second uplink control channel may completely overlap in time.

If two different uplink control channels partially overlap in time, during a time overlap, considering that the first uplink control channel and the second uplink control channel may be discontinuous in frequency, for example, the terminal device simultaneously sends the HARQ-ACK on the first uplink control channel and the periodic CSI on the second uplink control channel, PAPRs of signals sent by the terminal device are relatively large, and IMD between the sent signals is relatively large. Therefore, in this embodiment of the present invention, the terminal device can select an uplink control channel from the first uplink control channel and the second uplink control channel as the target uplink control channel, and send the first uplink control information and/or the second uplink control information through the target uplink control channel. In this way, the PAPRs of the signals and the IMD between the signals are reduced. In addition, the target uplink control channel is a channel having a greater capacity or a later end moment in the two uplink control channels. In this way, requirements of a URLLC service, of which a service latency is less than or equal to a preset latency threshold, and/or a service bit error rate is less than or equal to a preset bit error rate threshold, on the uplink control information transmission can be satisfied.

In this embodiment of the present invention, the terminal device can select the target uplink control channel in a plurality of manners, and several optional manners are described below.

Manner A: Select the target uplink control channel based on a capacity of the first uplink control channel and a capacity of the second uplink control channel.

Because the first uplink control information and the second uplink control information need to be simultaneously transmitted, a needed capacity may be relatively large. The terminal device can select an uplink control channel having a greater capacity as the target uplink control channel, to ensure as much as possible that the first uplink control information and the second uplink control information can both be sent, to prevent UCI information from being discarded because of an insufficient capacity of the uplink control channel and prevent serving of a service from being affected. For example, for the first uplink control channel and the second uplink control channel, the terminal device may select a channel having a greater capacity from the two as the target uplink control channel, to ensure that the terminal device can feed back to-be-fed-back UCI information as much as possible to the network device, thereby ensuring serving performance of a service. Optionally, the terminal device may determine a capacity of the first uplink control channel based on a format of the first uplink control channel or control information related to the first uplink control channel, and determine a capacity of the second uplink control channel based on a format of the second uplink control channel or control information related to the second uplink control channel.

For example, the terminal device needs to send a HARQ-ACK and periodic CSI in a same uplink slot, the uplink control channel is a PUCCH, and a format of a PUCCH resource corresponding to the HARQ-ACK is a long PUCCH. Referring to the FIG. 6, using the slot including seven symbols as an example, the PUCCH resource corresponding to the HARQ-ACK occupies four symbols of the slot. A format of the PUCCH resource corresponding to the periodic CSI is also the long PUCCH, and still referring to FIG. 6, the PUCCH resource corresponding to the periodic CSI occupies five symbols of the slot. Therefore, the terminal device may select the PUCCH resource corresponding to the periodic CSI as a target PUCCH resource, and send the HARQ-ACK and the periodic CSI through the target PUCCH resource.

However, different uplink control information may have different latency requirements. For example, a service latency of the first-type service is less than or equal to a preset latency threshold, and/or a service bit error rate of the first-type service is less than or equal to a preset bit error rate threshold. That is, the first-type service has a higher latency requirement. Therefore, uplink control information corresponding to this type of service needs to be transmitted to the network device in time, to satisfy a reliability requirement of the service. Alternatively, some temporary urgent services may have a relatively high latency requirement, and uplink control information corresponding to this type of service also needs to be transmitted to the network device in time. Therefore, if a selection is made based on only capacities, possibly, latency requirements cannot be satisfied sometimes.

In view of this, in the embodiments of the present invention, when the target uplink control channel is selected, a service type and time information that correspond to the uplink control information may also be considered. When the time information is considered, an end moment of the uplink control channel may be considered, or a start moment of the uplink control channel may be considered.

Manner B: The terminal device can determine the target uplink control channel based on a service type corresponding to the first uplink control information, an end moment of the first uplink control channel, and an end moment of the second uplink control channel.

In an example, if the first uplink control information is control information corresponding to a first-type service, and the end moment of the first uplink control channel is different from the end moment of the second uplink control channel, the target uplink control channel is an uplink control channel having an earlier end moment in the first uplink control channel and the second uplink control channel.

For example, the first-type service is a URLLC service. Because the URLLC service has a relatively high latency requirement due to service urgency, uplink control information transmitted on a PUCCH includes HARQ-ACK information corresponding to downlink URLLC data. If the HARQ-ACK information is a NACK, the network device needs to retransmit the previous downlink URLLC data to the terminal device based on the NACK information, to help a downlink URLLC service satisfy a specified reliability requirement while satisfying a specified latency requirement. If the HARQ-ACK information is an ACK, the network device can determine that the downlink URLLC data sent to the terminal device has been correctly received on a terminal device side. It can be learned that if information carried in the PUCCH includes the HARQ-ACK, if the uplink control channel is selected based on only capacities, then if a selected target uplink control channel has a later end moment, sending the HARQ-ACK on the uplink control channel having the later end moment may affect service requirements for a low latency and high reliability of the downlink URLLC service and an uplink URLLC service. Therefore, only if one piece of uplink control information in the first uplink control information and the second uplink control information corresponds to first-type service information, and the end moment of the first uplink control channel is different from the end moment of the second uplink control channel, the terminal device can select an uplink control channel having an earlier end moment from the first uplink control channel and the second uplink control channel as the target uplink control channel, to satisfy, in this manner as much as possible, a latency requirement of the first-type service.

In another example, if the first uplink control information or the second uplink control information is control information corresponding to a first-type service, and a difference between the end moment of the first uplink control channel and the end moment of the second uplink control channel is greater than a first threshold, the target uplink control channel is an uplink control channel having an earlier end moment in the first uplink control channel and the second uplink control channel.

In the examples stated above, only if the end moment of the first uplink control channel is different from the end moment of the second uplink control channel, the terminal device can select an uplink control channel having an earlier end moment in the first uplink control channel and the second uplink control channel as the target uplink control channel. However, in this embodiment, the terminal device can further determine a difference between the end moment of the first uplink control channel and the end moment of the second uplink control channel. If the difference between the end moment of the first uplink control channel and the end moment of the second uplink control channel is greater than a first threshold, it indicates that if an uplink control channel having a later end moment is selected as the target uplink control channel, sending uplink control information through such a target uplink control channel may lead to a higher transmission latency of the uplink control information. Consequently, a latency requirement of a service or a system cannot be satisfied. Therefore, if the difference between the end moment of the first uplink control channel and the end moment of the second uplink control channel is greater than the first threshold, the terminal device determines to select an uplink control channel having an earlier end moment in the first uplink control channel and the second uplink control channel as the target uplink control channel. By determining the difference between the end moment of the first uplink control channel and the end moment of the second uplink control channel, the terminal device is enabled to select the target uplink control channel more accurately. It should be noted that the first threshold may be a preset value. For example, a same preset value is saved in the base station and the terminal device as the first threshold. The preset value of the first threshold is a fixed value specified in a radio communication system. In addition, the first threshold may alternatively be a value indicated in configuration information sent by the base station to the terminal device.

In another example, if the first uplink control information is control information corresponding to a first-type service, and a difference between the end moment of the first uplink control channel and the end moment of the second uplink control channel is less than or equal to a first threshold, the target uplink control channel is an uplink control channel having a greater capacity in the first uplink control channel and the second uplink control channel. In this embodiment of the present invention, a case in which the difference between the end moment of the first uplink control channel and the end moment of the second uplink control channel is equal to the threshold is divided into this example an example. In practice, a case in which the difference between the end moment of the first uplink control channel and the end moment of the second uplink control channel is equal to the threshold may alternatively be divided into the preceding example. That is, the preceding example is changed to: If the first uplink control information or the second uplink control information is control information corresponding to a first-type service, and a difference between the end moment of the first uplink control channel and the end moment of the second uplink control channel is greater than or equal to a first threshold, the target uplink control channel is an uplink control channel having an earlier end moment in the first uplink control channel and the second uplink control channel. In other words, division of a mean value point is not limited in the embodiments of the present invention.

If the difference between the end moment of the first uplink control channel and the end moment of the second uplink control channel is less than or equal to a first threshold, indicating a relatively small difference between the end moments of the two uplink control channels, regardless of which uplink control channel is selected as the target uplink control channel, the uplink control information corresponding to a first-type service is not much affected, that is, transmission latencies may be almost the same. In this case, the terminal device may select the target uplink control channel with reference to a further factor. For example, the terminal device may randomly select the first uplink control channel or the second uplink control channel as the target uplink control channel. Alternatively, because regardless of which uplink control channel is selected, a latency requirement can basically be met, the terminal device can select, out of consideration for complete transmission of the uplink control information, an uplink control channel having a greater capacity in the first uplink control channel and the second uplink control channel as the target uplink control channel, to ensure as much as possible that both the first uplink control information and the second uplink control information can be completely transmitted, thereby preventing information from being discarded. The same as the above, the first threshold may be a preset value. For example, a same preset value is saved in the base station and the terminal device as the first threshold. The preset value of the first threshold is a fixed value specified in a radio communication system. In addition, the first threshold may alternatively be a value indicated in configuration information sent by the base station to the terminal device.

In another example, if the first uplink control information is control information corresponding to a first-type service, and the end moment of the first uplink control channel is the same as the end moment of the second uplink control channel, the target uplink control channel is an uplink control channel having a greater capacity in the first uplink control channel and the second uplink control channel.

If the end moment of the first uplink control channel is the same as the end moment of the second uplink control channel, indicating no difference between the end moments of the two uplink control channels, regardless of which uplink control channel is selected as the target uplink control channel, the uplink control information corresponding to a first-type service is not much affected, that is, transmission latencies may be almost the same. In this case, the terminal device may also select the target uplink control channel with reference to a further factor. For example, the terminal device may randomly select the first uplink control channel or the second uplink control channel as the target uplink control channel, or the terminal device may select, out of consideration for complete transmission of the uplink control information, an uplink control channel having a greater capacity in the first uplink control channel and the second uplink control channel as the target uplink control channel, to ensure as much as possible that both the first uplink control information and the second uplink control information can be completely transmitted, thereby preventing information from being discarded.

Any one of or a combination of some of the several examples in the manner B may be used in an actual application.

In the manner B, a manner in which the terminal device determines the target uplink control channel based on the service type and the time information that correspond to the uplink control information. A manner C is further described below, and is a manner in which the terminal device determines the target uplink control channel based on a service type corresponding to the uplink control information and a capacity of an uplink control channel.

Manner C. The terminal device can determine the target uplink control channel in the first uplink control channel and the second uplink control channel based on a service type corresponding to the first uplink control information, a capacity of the first uplink control channel, and a capacity of the second uplink control channel.

For example, if the first uplink control information is control information corresponding to a first-type service, the target uplink control channel is an uplink control channel having a greater capacity in the first uplink control channel and the second uplink control channel.

The first-type service has a reliability requirement. Therefore, to ensure complete transmission of information as much as possible, an uplink control channel having a greater capacity in the first uplink control channel and the second uplink control channel can be directly selected as the target uplink control channel, thereby preventing information from being discarded. Optionally, the terminal device may determine a capacity of the first uplink control channel based on a format of the first uplink control channel or control information related to the first uplink control channel, and determine a capacity of the second uplink control channel based on a format of the second uplink control channel or control information related to the second uplink control channel.

In the several manners of selecting the target uplink control channel described above, either the capacity of the uplink control channel or the service type corresponding to the uplink control information is considered, or both of the capacity of the uplink control channel and the service type corresponding to the uplink control information are considered. A manner D of selecting the target uplink control channel is further described below. In the manner D, the target uplink control channel is selected based on time information of the uplink control channel.

Manner D. Determine the target uplink control channel based on an end moment of the first uplink control channel and an end moment of the second uplink control channel.

Regardless of which type of uplink control information is transmitted, naturally, a smaller latency is better. Therefore, even if service types of the first uplink control information and the second uplink control information are not considered, the terminal device can also select the target uplink control channel based on time information of the uplink control channel.

In an example, the terminal device may select an uplink control channel having an earlier end moment in the first uplink control channel and the second uplink control channel as the target uplink control channel, to reduce a transmission latency of uplink control information as much as possible.

In this embodiment of the present invention, to make a selection more accurately, the terminal device may alternatively select the target uplink control channel with reference to the difference between the end moment of the first uplink control channel and the end moment of the second uplink control channel.

In another example, if a difference between the end moment of the first uplink control channel and the end moment of the second uplink control channel is greater than a first threshold, the target uplink control channel is an uplink control channel having an earlier end moment in the first uplink control channel and the second uplink control channel.

If the difference between the end moment of the first uplink control channel and the end moment of the second uplink control channel is greater than a first threshold, it indicates that if an uplink control channel having a later end moment is selected as the target uplink control channel, sending uplink control information corresponding to the first-type service through such a target uplink control channel may fail to satisfy the latency requirement of the first-type service. Therefore, if the difference between the end moment of the first uplink control channel and the end moment of the second uplink control channel is greater than the first threshold, the terminal device determines to select an uplink control channel having an earlier end moment in the first uplink control channel and the second uplink control channel as the target uplink control channel. By determining the difference between the end moment of the first uplink control channel and the end moment of the second uplink control channel, the terminal device is enabled to select the target uplink control channel more accurately. The same as the above, the first threshold may be a preset value. For example, a same preset value is saved in the base station and the terminal device as the first threshold. The preset value of the first threshold is a fixed value specified in a radio communication system. In addition, the first threshold may alternatively be a value indicated in configuration information sent by the base station to the terminal device.

In another example, if a difference between the end moment of the first uplink control channel and the end moment of the second uplink control channel is less than or equal to a first threshold, the target uplink control channel is the first uplink control channel or the second uplink control channel. In this embodiment of the present invention, a case in which the difference between the end moment of the first uplink control channel and the end moment of the second uplink control channel is equal to the threshold is divided into this example an example. In practice, a case in which the difference between the end moment of the first uplink control channel and the end moment of the second uplink control channel is equal to the threshold may alternatively be divided into the preceding example. That is, the preceding example is changed to: If a difference between the end moment of the first uplink control channel and the end moment of the second uplink control channel is greater than or equal to a first threshold, the target uplink control channel is an uplink control channel having an earlier end moment in the first uplink control channel and the second uplink control channel.

If a difference between the end moment of the first uplink control channel and the end moment of the second uplink control channel is less than or equal to a first threshold, indicating a relatively small difference between the end moments of the two uplink control channels, regardless of which uplink control channel is selected as the target uplink control channel, the uplink control information corresponding to the first-type service is not much affected, that is, transmission latencies may be almost the same. In this case, the terminal device may select the target uplink control channel with reference to a further factor. For example, the terminal device may randomly select the first uplink control channel or the second uplink control channel as the target uplink control channel. Alternatively, because regardless of which uplink control channel is selected, a latency requirement can basically be met, the terminal device can select, out of consideration for complete transmission of the uplink control information, an uplink control channel having a greater capacity in the first uplink control channel and the second uplink control channel as the target uplink control channel, to ensure as much as possible that both the first uplink control information and the second uplink control information can be completely transmitted, thereby preventing information from being discarded. Certainly, the terminal device may alternatively select the target uplink control channel in the first uplink control channel and the second uplink control channel with reference to another factor. This is not limited in the embodiments of the present invention.

For example, the first uplink control information or the second uplink control information is a HARQ-ACK, and the HARQ-ACK needs to be generated only after the terminal device demodulates the downlink data. If the uplink control channel starts too early, the terminal device may have no time to demodulate the downlink data or have no time to complete demodulation of the downlink data, and the terminal device cannot obtain the uplink control information. In this case, there may be a case in which transmission of the uplink control channel has been started after the terminal device generates the uplink control information, and consequently, the uplink control information cannot be transmitted. Therefore, in this embodiment of the present invention, the terminal device not only can select the target uplink control channel with reference to the difference between the end moment of the first uplink control channel and the end moment of the second uplink control channel, but also can select the target uplink control channel with reference to the difference between the start moment of the first uplink control channel and the start moment of the second uplink control channel. A manner E is described below, and is another manner in which the target control channel is selected based on the time information.

Any one of or a combination of some of the several examples in the manner D may be used in an actual application.

Manner E. The terminal device determines the target uplink control channel based on a start moment of the first uplink control channel and a start moment of the second uplink control channel, and/or based on an end moment of the first uplink control channel and an end moment of the second uplink control channel.

In an example, if the end moment of the second uplink control channel is earlier than the end moment of the first uplink control channel, and a difference between the start moment of the second uplink control channel and the start moment of the first uplink control channel is less than a second threshold, the target uplink control channel is the second uplink control channel.

If the difference between the end moments of the two uplink control channels is considered, the difference between the start moments of the two uplink control channels may be further considered. If the end moment of the second uplink control channel is earlier than the end moment of the first uplink control channel, and the difference between the start moment of the second uplink control channel and the start moment of the first uplink control channel is less than a second threshold, it indicates that a difference between the first uplink control channel and the second uplink control channel is relatively small. Possibly, neither of the uplink control channels starts too early, so that neither of the uplink control channels is likely to start transmission or complete transmission before the terminal device obtains the uplink control information. In this case, the terminal device can select an uplink control channel having an earlier end moment in the two uplink control channels. To be specific, if transmission of the uplink control information is ensured, a transmission latency can be reduced as much as possible by selecting an uplink control channel having an earlier end moment. It should be noted that the second threshold may be a preset value. For example, a same preset value is saved in the base station and the terminal device as the second threshold. The preset value of the second threshold is a fixed value specified in a radio communication system. In addition, the second threshold may alternatively be a value indicated in configuration information sent by the base station to the terminal device.

In another example, if the end moment of the second uplink control channel is earlier than the end moment of the first uplink control channel, and a difference between the start moment of the second uplink control channel and the start moment of the first uplink control channel is greater than or equal to a second threshold, the target uplink control channel is the second uplink control channel. In this embodiment of the present invention, a case in which the difference between the start moment of the first uplink control channel and the start moment of the second uplink control channel is equal to the threshold is divided into this example an example. In practice, a case in which the difference between the start moment of the first uplink control channel and the start moment of the second uplink control channel is equal to the threshold may alternatively be divided into the preceding example. That is, the preceding example is changed to: If the end moment of the second uplink control channel is earlier than the end moment of the first uplink control channel, and a difference between the start moment of the second uplink control channel and the start moment of the first uplink control channel is less than or equal to a second threshold, the target uplink control channel is the second uplink control channel.

If the end moment of the second uplink control channel is earlier than the end moment of the first uplink control channel, and a difference between the start moment of the second uplink control channel and the start moment of the first uplink control channel is greater than or equal to a second threshold, it indicates that a difference between the first uplink control channel and the second uplink control channel is relatively large. If an uplink control channel having an earlier start moment is selected as the target uplink control channel, possibly, transmission of the target uplink control channel may have been started or completed before the terminal device demodulates downlink data or completes demodulation of downlink data. Consequently, the uplink control information generated by the terminal device cannot be completely transmitted or even cannot be transmitted. Therefore, in this case, the uplink control channel having a later end moment may be selected as the target uplink control channel whenever possible because if the end moment is later, more time can be spent to wait for the terminal device to demodulate the downlink data, to ensure as much as possible that the uplink control information can be transmitted.

In another example, if the end moment of the second uplink control channel is later than the end moment of the first uplink control channel, the target uplink control channel is the first uplink control channel.

In such an example, the terminal device can directly select an uplink control channel having an earlier end moment as the target uplink control channel, to reduce a transmission latency of the uplink control information.

Any one of or a combination of some of the several examples in the manner E may be used in an actual application.

A plurality of manners of selecting the target uplink control channel are described above, and the various manners above may be used independently or in any combination. The terminal device can select different manners with reference to different actual situations to select the target uplink control channel, and a specific manner in which the target uplink control channel is selected may alternatively be specified by a protocol. This is not limited in the embodiments of the present invention. In addition, it should be noted that the several manners above are merely examples, and are not intended to limit the technical solutions of the embodiments of the present invention. Any manner in which an uplink control channel is selected from a plurality of uplink control channels shall fall within the protection scope of the embodiments of the present invention.

In this embodiment of the present invention, the network device may further send configuration information to the terminal device, and the configuration information is used to indicate that the terminal device is allowed to simultaneously transmit the first uplink control information and the second uplink control information, so that after receiving the configuration information, the terminal device can determine that the first uplink control information and the second uplink control information can be simultaneously transmitted. If the network device does not send the configuration information to the terminal device, the terminal device may choose to send the first uplink control information on the first uplink control channel and send the second uplink control information on the second uplink control channel, that is, send corresponding pieces of uplink control information on the uplink control channels respectively. Alternatively, if the network device does not send the configuration information to the terminal device, the terminal device may select one uplink control channel in the first uplink control channel and the second uplink control channel to send the first uplink control information or the second uplink control information. With regard to choosing to send the first uplink control information or the second uplink control information, a choosing manner is not limited in the embodiments of the present invention. For example, if a selection is made based on latency requirements of the first uplink control information and the second uplink control information, the uplink control information having a higher latency requirement in the first uplink control information and the second uplink control information is selected for transmission. Alternatively, if a selection is made based on importance of services corresponding to the first uplink control information and the second uplink control information, the uplink control information corresponding to the service having higher importance in the first uplink control information and the second uplink control information is selected for transmission.

In addition, not only the terminal device needs to determine the target uplink control channel in the first uplink control channel and the second uplink control channel, but also the network device needs to determine the target uplink control channel in the first uplink control channel and the second uplink control channel. The network device may determine the target uplink control channel in the first uplink control channel and the second uplink control channel in a manner the same as that of the terminal device. It can be considered that the network device also determines the target uplink control channel in S41.

S42. The terminal device sends target uplink control information on the target uplink control channel, and the network device receives the target uplink control information on the target uplink control channel. The target uplink control information includes first uplink control information and/or second uplink control information.

In this embodiment of the present invention, the target uplink control information sent by the terminal device includes N-bit information having a highest priority in the first uplink control information and the second uplink control information, where N is less than or equal to a quantity of bits corresponding to the capacity of the target uplink control channel. To be specific, the target uplink control information sent by the terminal device needs to adapt to the capacity of the target uplink control channel. The N-bit information may be N-bit information included in the first uplink control information, or may be N-bit information included in the second uplink control information. Alternatively, the N-bit information may include entire content of the first uplink control information and partial content of the second uplink control information, or the N-bit information may include entire content of the second uplink control information and partial content of the first uplink control information. That is, if a total capacity of the first uplink control information and the second uplink control information is less than or equal to the capacity of the target uplink control channel, the terminal device can completely send the first uplink control information and the second uplink control information, to ensure integrity of the information. However, if a total capacity of the first uplink control information and the second uplink control information is greater than the capacity of the target uplink control channel, the terminal device may choose to send N-bit information having a highest priority in the first uplink control information and the second uplink control information, to ensure as much as possible that information having a high priority can be sent.

In this embodiment of the present invention, the network device can determine the target uplink control channel in the first uplink control channel and the second uplink control channel in a manner the same as that of the terminal device, so that the target uplink control information can be received through the target uplink control channel. Optionally, the network device also learns that the target uplink control information sent by the terminal device may include N-bit information having a highest priority in the first uplink control information and the second uplink control information. Therefore, the network device can correctly detect the target uplink control information on the target uplink control channel.

The control information transmission method provided in the embodiments of the present invention is described above, and for ease of understanding, implementation processes of some examples of the method are described by using some specific examples.

For example, the network device configures, through higher-layer signaling, whether the terminal device is allowed to simultaneously transmit the HARQ-ACK (or LL-CSI) and the periodic CSI. The HARQ-ACK (or LL-CSI) corresponds to a first PUCCH, and the periodic CSI corresponds to a second PUCCH. Therefore, when the terminal device needs to simultaneously send the HARQ-ACK (or LL-CSI) and the periodic CSI in one uplink subframe, the following manners may be adopted: a. if configuration of the higher-layer signaling allows the terminal device to simultaneously transmit the HARQ-ACK (or LL-CSI) and CSI; a1. if an end moment of the second PUCCH is later than an end moment of the first PUCCH, the terminal device chooses to send the periodic CSI and the HARQ-ACK on the first PUCCH corresponding to the HARQ-ACK (or LL-CSI) in the uplink subframe; or a2. if an end moment of the first PUCCH is later than an end moment of the second PUCCH, the terminal device chooses to send the periodic CSI and the HARQ-ACK (or LL-CSI) on the second PUCCH corresponding to the periodic CSI in the uplink subframe; or b. if configuration of the higher-layer signaling does not allow the terminal device to simultaneously transmit the HARQ-ACK (or LL-CSI) and the periodic CSI, then when the terminal device needs to simultaneously send the HARQ-ACK (or LL-CSI) and the periodic CSI in one uplink subframe, because the HARQ-ACK has a higher latency requirement, the terminal device chooses to send the HARQ-ACK (or LL-CSI) on the first PUCCH corresponding to the HARQ-ACK (or LL-CSI) in the uplink subframe, and to prevent interference, the periodic CSI may be discarded.

For another example, the network device configures, through higher-layer signaling, whether the terminal device is allowed to simultaneously transmit the HARQ-ACK (or LL-CSI) and the SR. The HARQ-ACK (or LL-CSI) corresponds to a first PUCCH, and the SR corresponds to a third PUCCH. When the terminal device needs to simultaneously send the HARQ-ACK (or LL-CSI) and the SR in one uplink subframe, the following manners may be adopted: c. if configuration of the higher-layer signaling allows the terminal device to simultaneously transmit the HARQ-ACK (or LL-CSI) and the SR, c1. if an end moment of the third PUCCH is later than an end moment of the first PUCCH, the terminal device chooses to send the HARQ-ACK and the SR on the first PUCCH corresponding to the HARQ-ACK (or LL-CSI) in the uplink subframe; or c2. if an end moment of the first PUCCH is later than an end moment of the third PUCCH, the terminal device chooses to send the SR on the third PUCCH corresponding to the SR in the uplink subframe, where if the third PUCCH has a remaining capacity after carrying the SR, the terminal device may further send the HARQ-ACK (or LL-CSI) by using the remaining capacity of the third PUCCH, and the sent HARQ-ACK (or LL-CSI) may be complete information or partial information; or d. if configuration of the higher-layer signaling does not allow the terminal device to simultaneously transmit the HARQ-ACK (or LL-CSI) and the SR, then when the terminal device needs to simultaneously send the HARQ-ACK (or LL-CSI) and the SR in one uplink subframe, because the SR has a higher latency requirement, the terminal device may choose to send the SR on the first PUCCH corresponding to the SR in the uplink subframe, and to avoid interference, the HARQ-ACK (or LL-CSI) may be discarded.

Certainly, because the foregoing examples are illustratively, only some examples of the control information transmission method provided above are described, and for another example, a person skilled in the art shall naturally know how to carry out it.

The apparatus provided in the embodiments of the present invention is described below with reference to the accompanying drawings.

Figure 6:
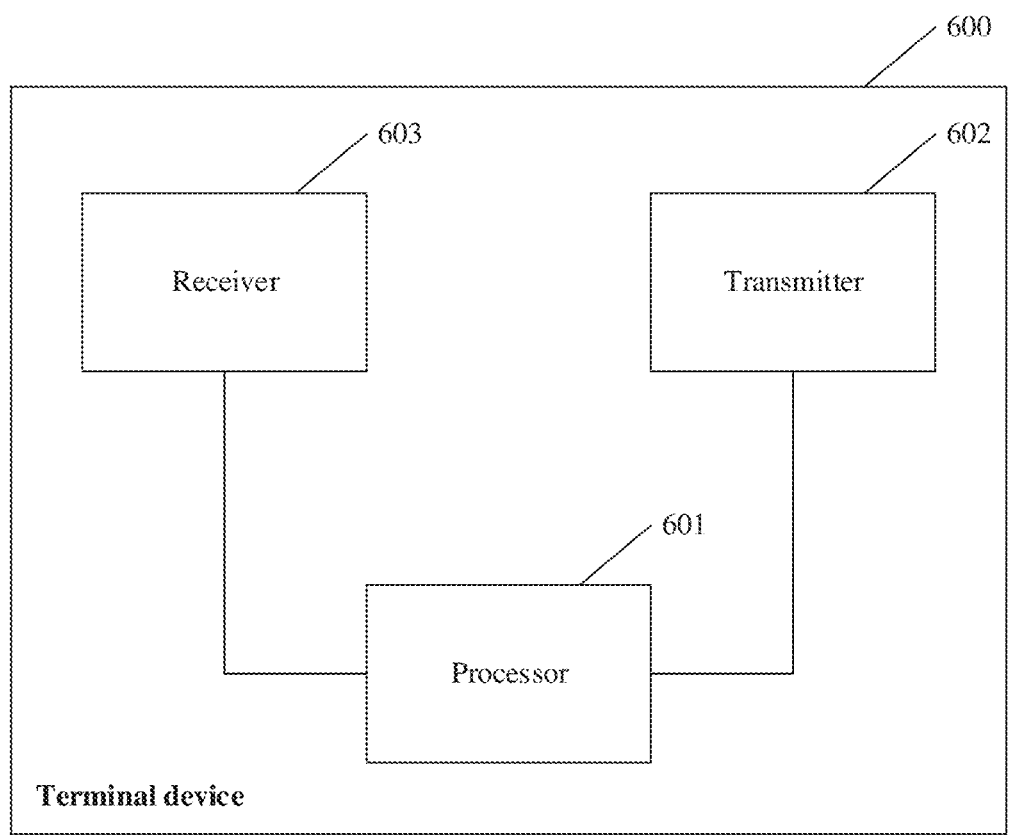
FIG. 6 is a schematic structural diagram of a terminal device according to an embodiment of the present invention.

FIG. 6 is a schematic structural diagram of a terminal device 600. The terminal device 600 may implement functions of the terminal device included above. The terminal device 600 may include a processor 601 and a transmitter 602. The processor 601 may be configured to perform S41 in the embodiment shown in FIG. 4, and/or configured to support another process of the technology described in this specification. The transmitter 602 may be configured to perform S42 in the embodiment shown in FIG. 4, and/or configured to support another process of the technology described in this specification. Optionally, the terminal device 600 may further include a receiver 603. The receiver 603 may be configured to receive configuration information sent by a network device, and/or configured to support another process of the technology described in this specification. For all related content of all the steps included in the foregoing method embodiments, refer to descriptions on functions of corresponding functional modules. Details are not described herein again.

Figure 7:
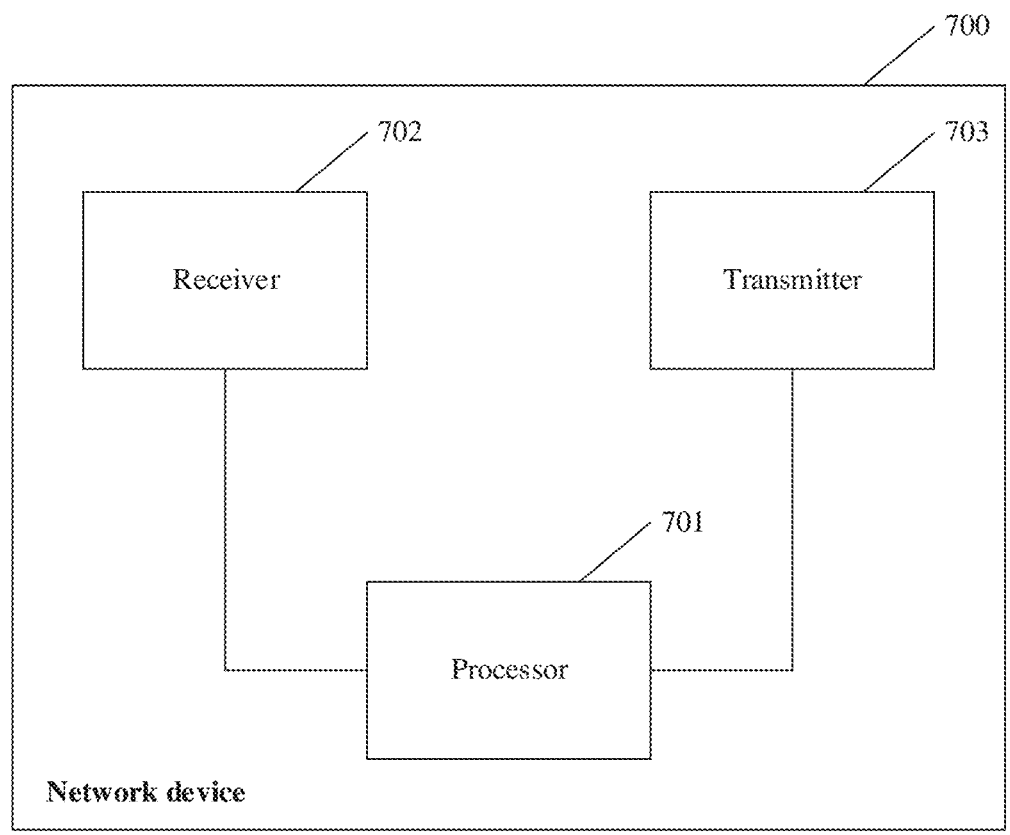
FIG. 7 is a schematic structural diagram of a network device according to an embodiment of the present invention.

FIG. 7 is a schematic structural diagram of a communication apparatus 700. The communication apparatus 700 may implement functions of the network device included above. The communication apparatus 700 may include a processor 701 and a receiver 702. The processor 701 may be configured to perform S41 in the embodiment shown in FIG. 4, and/or configured to support another process of the technology described in this specification. The receiver 702 may be configured to perform S42 in the embodiment shown in FIG. 4, and/or configured to support another process of the technology described in this specification. Optionally, the network device 700 may further include a transmitter 703. The transmitter 703 may be configured to send configuration information to a terminal device, and/or configured to support another process of the technology described in this specification. For all related content of all the steps included in the foregoing method embodiments, refer to descriptions on functions of corresponding functional modules. Details are not described herein again.

In the embodiments of the present invention, the terminal device 600 and the network device 700 are presented in a form of a functional module being divided based on a function, or are presented in a form of a functional module being divided in an integrated manner. The "module" herein may be an application-specific integrated circuit (application-specific integrated circuit, ASIC), a processor and a memory for executing one or more software or firmware programs, an integrated logic circuit, and/or another component that can provide the foregoing function.

Figure 8:
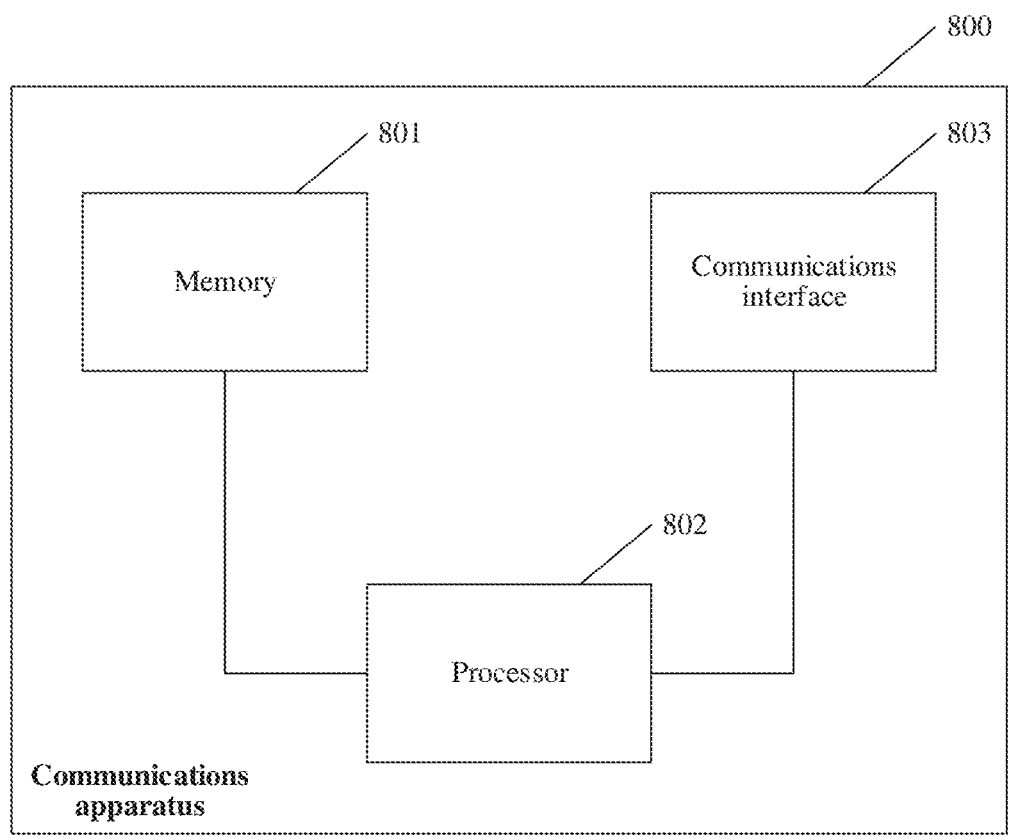
FIG. 8 is a schematic diagram of a communication apparatus according to an embodiment of the present invention.

In a simple embodiment, a person skilled in the art may conceive of that the terminal device 600 or the network device 700 may alternatively be implemented by using the structure of the communication apparatus 800 as shown in the FIG. 8.

As shown in the FIG. 8, the communication apparatus 800 may include: a memory 800, a processor 802, and a communication interface 803. The memory 801 and the communication interface 803 are connected to the processor 802. The memory 801 is configured to store a computer-executable instruction, and when the communication apparatus 800 operates, the processor 802 executes the computer-executable instruction stored in the memory 800, so that the communication apparatus 800 is enabled to perform the method provided in the embodiment shown in the FIG. 4. Refer to the related descriptions in the foregoing text and the accompanying drawings for a specific method. Details are not described herein again. The communication interface 803 can be implemented by using a transceiver, or can be implemented by using a receiver and a transmitter that are independent of each other.

In an example, the transmitter 602 and the receiver 603 can correspond to the communication interface 803 in the FIG. 8. The processor 601 can be embedded in or independent of the memory 801 of the communication apparatus 800 in a hardware form or a software form.

In an example, the receiver 702 and the transmitter 703 can correspond to the communication interface 803 in the FIG. 8. The processor 701 can be embedded in or independent of the memory 801 of the communication apparatus 800 in a hardware form or a software form.

Optionally, the communication apparatus 800 may be a field-programmable gate array (FPGA), an application specific integrated circuit (ASIC), a system on chip (SoC), a central processor unit (CPU), a network processor (NP), a digital signal processor (DSP), a micro controller unit (MCU), or a programmable logic device (PLD) or another integrated chip may be used. Alternatively, the communication apparatus 800 may be an independent network element, for example, the terminal device or the network device as described above.

In addition, the terminal device provided in the embodiment shown in FIG. 6 may alternatively be implemented in another form. For example, the terminal device includes a sending unit and a processing unit. The processing unit may be configured to perform S41 in the embodiment shown in FIG. 4, and/or configured to support another process of the technology described in this specification. The sending unit may be configured to perform S42 in the embodiment shown in FIG. 4, and/or configured to support another process of the technology described in this specification. Optionally, the terminal device may further include a receiving unit. The receiving unit may be configured to receive configuration information sent by a network device, and/or configured to support another process of the technology described in this specification. For all related content of all the steps included in the foregoing method embodiments, refer to descriptions on functions of corresponding functional modules. Details are not described herein again.

In addition, the network device provided in the embodiment shown in FIG. 7 may alternatively be implemented in another form. For example, the network device includes a receiving unit and a processing unit. The processing unit may be configured to perform S41 in the embodiment shown in FIG. 4, and/or configured to support another process of the technology described in this specification. The receiving unit may be configured to perform S42 in the embodiment shown in FIG. 4, and/or configured to support another process of the technology described in this specification. Optionally, the network device may further include a sending unit. The sending unit may be configured to send configuration information to a network device, and/or configured to support another process of the technology described in this specification. For all related content of all the steps included in the foregoing method embodiments, refer to descriptions on functions of corresponding functional modules. Details are not described herein again.

The terminal device 600, the network device 700, and the communication apparatus 800 provided in the embodiments of the present invention can be configured to perform the method provided in the embodiment shown in the FIG. 4. Therefore, for technical effects that can be obtained by them, refer to the foregoing method embodiments. Details are not described herein again.

The embodiments of the present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

Obviously, a person skilled in the art can make various modifications and variations to embodiments of the present invention without departing from the spirit and scope of this application. This application is intended to cover these modifications and variations provided that they fall within the scope of protection defined by the following claims and their equivalent technologies.

What is claimed is:

1. A method, comprising:
   selecting, by a terminal device, a target uplink control channel from a group of uplink control channels comprising a first uplink control channel and a second uplink control channel, wherein the first uplink control channel corresponds to first uplink control information having a first type, and the second uplink control channel corresponds to second uplink control information having a second type, and wherein the first uplink control channel is allocated by a network device using a first preset timing rule that is determined according to the first type of the first uplink control information, and the second uplink control channel is allocated by the network device using a second preset timing rule that is determined according to the second type of the second uplink control information, and selecting the target uplink control channel comprises:
   in response to determining that the first uplink control information is control information corresponding to a first-type service, and that a difference between an end moment of the first uplink control channel and an end moment of the second uplink control channel is greater than a first threshold, selecting the target uplink control channel to be an uplink control channel having an earlier end moment of the first uplink control channel and the second uplink control channel; and
   sending, by the terminal device, target uplink control information on the target uplink control channel, wherein the target uplink control information comprises the first uplink control information and the second uplink control information; and
   wherein a service latency of the first-type service is less than or equal to a preset latency threshold, or a service bit error rate of the first-type service is less than or equal to a preset bit error rate threshold.

2. The method according to claim 1, wherein selecting the target uplink control channel further comprises:
in response to determining that the first uplink control information is control information corresponding to the first-type service and that the difference between the end moment of the first uplink control channel and the end moment of the second uplink control channel is less than or equal to the first threshold, selecting the target uplink control channel to be an uplink control channel having a greater capacity of the first uplink control channel and the second uplink control channel.

3. The method according to claim 1, wherein:
the first uplink control information is hybrid automatic repeat request-acknowledgement information, and the second uplink control information is first-type channel state information.

4. The method according to claim 3, wherein the first-type channel state information is periodic channel state information.

5. The method according to claim 1, wherein before the terminal device sends the target uplink control information on the target uplink control channel, the method further comprises:
receiving, by the terminal device, configuration information, wherein the configuration information indicates that the terminal device is allowed to simultaneously transmit the first uplink control information and the second uplink control information.

6. The method according to claim 1, wherein:
the first uplink control information is second-type channel state information, and the second uplink control information is first-type channel state information, and wherein the first-type channel state information is periodic channel state information, and the second-type channel state information is low latency channel state information.

7. The method according to claim 1, wherein:
the first uplink control information is first-type scheduling request information, and the second uplink control information is hybrid automatic repeat request-acknowledgement information, first-type channel state information, or second-type channel state information, and wherein the first-type channel state information is periodic channel state information, the second-type channel state information is low latency channel state information, and the first-type scheduling request information is a scheduling request corresponding to a first-type service.

8. A method, comprising:
selecting, by a network device, a target uplink control channel from a group of uplink control channels comprising a first uplink control channel and a second uplink control channel, wherein the first uplink control channel corresponds to first uplink control information having a first type, and the second uplink control channel corresponds to second uplink control information having a second type, and wherein the first uplink control channel is allocated by the network device using a first preset timing rule that is determined according to the first type of the first uplink control information, and the second uplink control channel is allocated by the network device using a second preset timing rule that is determined according to the second type of the second uplink control information, and selecting the target uplink control channel comprises:
in response to determining that the first uplink control information is control information corresponding to a first-type service, and that a difference between an end moment of the first uplink control channel and an end moment of the second uplink control channel is greater than a first threshold, selecting the target uplink control channel to be an uplink control channel having an earlier end moment of the first uplink control channel and the second uplink control channel; and
receiving, by the network device on the target uplink control channel, target uplink control information sent by a terminal device, wherein the target uplink control information comprises the first uplink control information and the second uplink control information; and
wherein a service latency of the first-type service is less than or equal to a preset latency threshold, or a service bit error rate of the first-type service is less than or equal to a preset bit error rate threshold.

9. The method according to claim 8, wherein selecting the target uplink control channel further comprises:
in response to determining that the first uplink control information is control information corresponding to the first-type service and that the difference between the end moment of the first uplink control channel and the end moment of the second uplink control channel is less than or equal to the first threshold, selecting the target uplink control channel to be an uplink control channel having a greater capacity of the first uplink control channel and the second uplink control channel.

10. An apparatus, comprising:
a non-transitory storage medium including executable instructions; and
a processor;
wherein the executable instructions, when executed by the processor, cause the apparatus to:
select a target uplink control channel from a group of uplink control channels comprising a first uplink control channel and a second uplink control channel, wherein the first uplink control channel corresponds to first uplink control information having a first type, and the second uplink control channel corresponds to second uplink control information having a second type, and wherein the first uplink control channel is allocated by a network device using a first preset timing rule that is determined according to the first type of the first uplink control information, and the second uplink control channel is allocated by the network device using a second preset timing rule that is determined according to the second type of the second uplink control information, and selecting the target uplink control channel comprises:
in response to determining that the first uplink control information is control information corresponding to a first-type service, and that a difference between an end moment of the first uplink control channel and an end moment of the second uplink control channel is greater than a first threshold, selecting the target uplink control channel to be an uplink control channel having an earlier end moment of the first uplink control channel and the second uplink control channel; and
send target uplink control information on the target uplink control channel, wherein the target uplink control information comprises the first uplink control information and the second uplink control information; and
wherein a service latency of the first-type service is less than or equal to a preset latency threshold, or a service bit error rate of the first-type service is less than or equal to a preset bit error rate threshold.

11. The apparatus according to claim 10, wherein selecting the target uplink control channel further comprises:
in response to determining that the first uplink control information is control information corresponding to the first-type service and the difference between the end moment of the first uplink control channel and the end moment of the second uplink control channel is less than or equal to the first threshold, selecting the target uplink control channel to be an uplink control channel having a greater capacity of the first uplink control channel and the second uplink control channel.

* * * * *